US011370432B2

(12) United States Patent
Fukaya et al.

(10) Patent No.: US 11,370,432 B2
(45) Date of Patent: Jun. 28, 2022

(54) VEHICLE CONTROL APPARATUS

(71) Applicant: Toyota Jidosha Kabushiki Kaisha, Toyota (JP)

(72) Inventors: Yuki Fukaya, Toyota (JP); Wataru Ike, Nagoya (JP); Kazuki Nemoto, Susono (JP); Yuta Takashina, Toyota (JP); Yuzo Kaneshige, Toyota (JP); Jun Tsuchida, Okazaki (JP); Yumi Shimanaka, Kasugai (JP); Masayasu Tanase, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 16/852,038

(22) Filed: Apr. 17, 2020

(65) Prior Publication Data

US 2020/0238988 A1    Jul. 30, 2020

Related U.S. Application Data

(63) Continuation of application No. 15/938,593, filed on Mar. 28, 2018, now Pat. No. 10,752,247.

(30) Foreign Application Priority Data

Mar. 28, 2017   (JP) .............................. JP2017-062780

(51) Int. Cl.
    B60W 30/16     (2020.01)
    B60W 30/09     (2012.01)
    (Continued)

(52) U.S. Cl.
    CPC ............ B60W 30/16 (2013.01); B60W 10/04 (2013.01); B60W 10/18 (2013.01); B60W 30/09 (2013.01);
    (Continued)

(58) Field of Classification Search
    CPC ...... B60W 30/16; B60W 30/09; B60W 10/18; B60W 30/14; B60W 30/15
    See application file for complete search history.

(56) References Cited

U.S. PATENT DOCUMENTS 3,892,483 A * 7/1975 Saufferer ............... G08G 1/166
                                               356/3.12
5,529,139 A * 6/1996 Kurahashi ....... B60W 30/18145
                                               180/169
(Continued)

FOREIGN PATENT DOCUMENTS

DE      102007060862 A1    7/2009
JP      2004-217175 A      8/2004
(Continued)

*Primary Examiner* — Mussa A Shaawat
(74) *Attorney, Agent, or Firm* — Dinsmore & Shohl LLP

(57) ABSTRACT

A vehicle control apparatus includes an electric control unit that performs a preceding vehicle trailing control which makes an own vehicle trail a preceding vehicle as an adaptive cruise control, and performs a first brake control which automatically applies a first braking control to the own vehicle when a time-to-collision to a target object is less than a first threshold. In a case where a performing condition for the first brake control has been determined to be satisfied during a performance of the adaptive cruise control, the electric control unit continues performing the adaptive cruise control without performing the first brake control when a deceleration control by the adaptive cruise control is being performed, whereas stops performing the adaptive cruise control when the deceleration control by the adaptive cruise control is not being performed.

10 Claims, 13 Drawing Sheets

(51) Int. Cl.
  *B60W 30/095* (2012.01)
  *B60W 10/04* (2006.01)
  *B60W 10/18* (2012.01)
  *B60W 30/14* (2006.01)
  *G08G 1/16* (2006.01)
  *B60W 40/04* (2006.01)

(52) U.S. Cl.
  CPC ...... *B60W 30/095* (2013.01); *B60W 30/0953* (2013.01); *B60W 30/0956* (2013.01); *B60W 30/143* (2013.01); *B60W 40/04* (2013.01); *B60W 2540/10* (2013.01); *B60W 2554/00* (2020.02); *B60W 2554/80* (2020.02); *B60W 2554/801* (2020.02); *B60W 2710/09* (2013.01); *B60W 2710/18* (2013.01); *B60W 2720/106* (2013.01); *G08G 1/166* (2013.01)

(56) References Cited

U.S. PATENT DOCUMENTS

| | | | |
|---|---|---|---|
| 6,678,603 B2 | 1/2004 | Egawa et al. | |
| 6,687,595 B2 | 2/2004 | Seto et al. | |
| 6,769,504 B2 | 8/2004 | Kobayashi et al. | |
| 6,941,216 B2 | 9/2005 | Isogai et al. | |
| 6,985,805 B2 | 1/2006 | Sudou et al. | |
| 7,292,940 B2 | 11/2007 | Isogai et al. | |
| 10,712,748 B2 | 7/2020 | Smartt et al. | |
| 2001/0027372 A1 | 10/2001 | Hellmann et al. | |
| 2003/0045990 A1 | 3/2003 | Adachi | |
| 2004/0130481 A1 | 7/2004 | Okai et al. | |
| 2004/0140143 A1 | 7/2004 | Saeki et al. | |
| 2004/0199327 A1 | 10/2004 | Isogai et al. | |
| 2006/0155469 A1* | 7/2006 | Kawasaki | B60R 21/013 701/301 |
| 2006/0212207 A1 | 9/2006 | Sugano et al. | |
| 2009/0128318 A1 | 5/2009 | Nagata et al. | |
| 2009/0234553 A1 | 9/2009 | Sekiguchi | |
| 2012/0293314 A1 | 11/2012 | Chatterjee et al. | |
| 2013/0151058 A1* | 6/2013 | Zagorski | B60W 30/09 701/23 |
| 2013/0268184 A1 | 10/2013 | Zagorski et al. | |
| 2016/0082961 A1 | 3/2016 | Tashiro et al. | |
| 2016/0207533 A1* | 7/2016 | Uechi | G08G 1/166 |
| 2019/0009720 A1 | 1/2019 | Omiya et al. | |

FOREIGN PATENT DOCUMENTS

| | | |
|---|---|---|
| JP | 2007-223596 A | 9/2007 |
| JP | 2008-001304 A | 1/2008 |
| JP | 2009-220630 A | 10/2009 |
| JP | 2017-114427 A | 6/2017 |

\* cited by examiner

VEHICLE CONTROL APPARATUS

CROSS-REFERENCE TO RELATED APPLICATIONS

This application is a continuation application of U.S. patent application Ser. No. 15/938,593 filed Mar. 28, 2018, which claims priority to Japanese Patent Application No. 2017-062780 filed Mar. 28, 2017 which are incorporated herein by reference.

TECHNICAL FIELD

The present disclosure relates to a vehicle control apparatus configured to perform an adaptive cruise control and a pre-crash brake control.

BACKGROUND ART

A vehicle control apparatus which performs an adaptive cruise control and a pre-crash brake control has been conventionally known. Hereinafter, a vehicle in which such a vehicle control apparatus is mounted is referred to as an "own vehicle".

The adaptive cruise control is a control to make the own vehicle travel at a predetermined constant speed when no preceding vehicle exists ahead of the own vehicle, and when there exists a preceding vehicle, to accelerate or decelerate the own vehicle in such a manner that the own vehicle trails the preceding vehicle, keeping a predetermined inter-vehicular distance. Specifically, in the adaptive cruise control where there exists the preceding vehicle, a target acceleration is calculated based on a "deviation between an inter-vehicular distance to the preceding vehicle and the predetermined inter-vehicular distance" and a "relative speed", and the own vehicle is accelerated or decelerated so that an acceleration of the own vehicle becomes equal to the target acceleration. Hereinafter, the adaptive cruise control is also referred to as an "ACC".

On the other hand, the pre-crash brake control is performed by a vehicle control apparatus where a pre-crash safety system (PCS) is adopted. The pre-crash brake control is a control to automatically generate a braking force when there exists a target object with a high probability of colliding with the own vehicle. Specifically, a time-to-collision (TTC) to a target object (a vehicle, a pedestrian, and a bicycle) is calculated based on a distance to this target object and a relative speed, and when the time-to-collision is less than or equal to a time threshold, the braking force is generated. Hereinafter, the pre-crash brake control is also referred to as a "PCBC".

One of prior art control apparatuses (hereinafter, referred to as a "prior art apparatus") capable of performing both of the ACC and the PCBC is configured to perform the PCBC in preference to the ACC when a performing condition for the PCBC is satisfied while the ACC is being performed and to cancel (stop) the ACC. That is, when the PCBC is performed while the ACC is being performed, the prior art apparatus is configured to cancel the ACC and thereafter not to resume the ACC automatically after the PCBC is finished (refer to Japanese Patent Application Laid-Open (kokai) No. 2007-223596.). This is because a collision avoidance function by the PCBC should be given priority over a function for reducing a driving load of a driver by the ACC. It should be noted that in the Japanese Patent Application Laid-Open (kokai) No. 2007-223596, the ACC is referred to as a "traveling state control" and the PCBC is referred to as a "collision avoidance control".

SUMMARY

However, according to the prior art apparatus, when the PCBC is performed during a trailing by the ACC, the ACC is canceled and not resumed after the PCBC is finished. Therefore, a case may arise where the driver has a strange or annoying feeling.

More specifically, in a case where the PCBC is performed due to an occurrence of a situation (hereinafter, also referred to as a "avoidance operation necessary situation") in which a brake operation by the driver during the trailing by the ACC is considered to be necessary in order to reduce a possibility of a collision, and the driver recognizes this avoidance operation necessary situation to determine that a deceleration of the own vehicle is necessary, the driver hardly has the strange or annoying feeling even when the ACC is not resumed after the PCBC is finished.

In contrast, for example, in a case where the PCBC is performed in a "situation where the driver does not consider oneself to be in the avoidance operation necessary situation", the driver is likely to have the strange or annoying feeling when the ACC is not resumed after the PCBC is finished. Here, following two cases can be specifically shown as the case where the PCBC is performed in the aforementioned situation. That is:

A case where the own vehicle approaches the preceding vehicle as a result of the driver trying to pass (overtake) the preceding vehicle by operating the steering wheel, and a performing condition for the PCBC is subsequently satisfied when the own vehicle is performing a deceleration control by the ACC by reason of the preceding vehicle having decelerated in a midst of the own vehicle trailing the preceding vehicle by the ACC.

A case where the own vehicle approaches a pedestrian or a bicycle existing beside a curved road, and the performing condition for the PCBC is subsequently satisfied when the own vehicle is performing the deceleration control by the ACC by reason of the preceding vehicle having approached the curved road and decelerated in a midst of the own vehicle trailing the preceding vehicle by the ACC.

In these case, the driver is likely to have the strange or annoying feeling since the driver is expecting the ACC to be continued.

In addition, for example, also in a case where the PCBC is performed in a "situation where the driver recognizes (considers) oneself to be in the avoidance operation necessary situation, however, the driver has an intension to avoid a collision by the steering wheel operation instead of the brake operation", the driver is likely to have the strange or annoying feeling when the ACC is not resumed after the PCBC is finished.

The present disclosure is made in order to resolve the problem above. That is, one of objects of the present disclosure is to provide a vehicle control apparatus capable of reducing a possibility of causing a strange or annoying feeling to a driver by continuing or resuming an ACC depending on a situation in a case when a performing condition for a PCBC is satisfied during the trailing by the ACC.

First vehicle control apparatus (hereinafter, also referred to as a "first apparatus") according to the present disclosure is applied to an own vehicle (100), and comprises:

an electric control unit configured to:
perform, as an adaptive cruise control, a preceding vehicle trailing control which makes said own vehicle (100) trail a preceding vehicle (200) which is a vehicle traveling ahead of said own vehicle (100) by calculating a target acceleration based on a distance to said preceding vehicle (200) and a relative speed with respect to said preceding vehicle (200);
perform an acceleration control for accelerating said own vehicle (100) and a deceleration control for decelerating said own vehicle (100) so that an acceleration of said own vehicle (100) coincides with said target acceleration;
calculate a time-to-collision (TTC) to a target object positioned in a predetermined region including a traveling direction of said own vehicle (100) based on a distance to said target object and a relative speed of said target object; and
determine that a performing condition for a first brake control which automatically applies a predetermined first braking force to said own vehicle (100) is satisfied when said time-to-collision (TTC) is less than a predetermined first threshold (TTCth1, TTCth2) so as to perform said first brake control.

The electric control unit is further configured to:
continue performing said adaptive cruise control when said deceleration control is being performed at a point in time when said performing condition for said first brake control has been determined to be satisfied during a performance of said adaptive cruise control;
stop performing said adaptive cruise control when said deceleration control is not being performed at said point in time; and
not to perform said first brake control when a performance of said adaptive cruise control is continued in a case where said performing condition for said first brake control is determined to be satisfied during a performance of said adaptive cruise control.

In the first apparatus, when the deceleration control is being performed at the point in time when the performing condition for the first brake control has been determined to be satisfied during a performance of the adaptive cruise control (ACC), the first brake control is not performed but the performance of the ACC (that is, a control including the preceding vehicle trailing control as one aspect thereof) is continued.

The performing condition for the first brake control is determined to be satisfied when the time-to-collision to the target object is less than the first threshold. The case where the deceleration control is being performed by the ACC at the point in time when the performing condition for the first brake control has been determined to be satisfied is highly likely to be a case where the time-to-collision becomes less than the first threshold in the "situation where the driver does not consider oneself to be in the avoidance operation necessary situation" or in the "situation where the driver recognizes (considers) oneself to be in the avoidance operation necessary situation, however, the driver has an intension to avoid a collision by the steering wheel operation instead of the brake operation". That is, the case above is highly likely to be a case where the driver does not assume the first brake control to be performed and rather expects the performance of the ACC to be continued. According to the first apparatus, the first brake control is not performed but the performance of the ACC is continued in such a case. Therefore, an occurrence of a situation where the first brake control is performed and the ACC is stopped contrary to the driver's expectation can be suppressed, and a possibility of giving a strange and annoying feeling to the driver can be reduced.

In another aspect of the present disclosure,
the electric control unit is configured to:
perform, as said adaptive cruise control, an acceleration override control which accelerates said own vehicle (100) in response to an accelerator operation by a driver of said own vehicle (100) when a required acceleration based on said accelerator operation is greater than said target acceleration,
continue performing said adaptive cruise control when said acceleration override control is being performed at said point in time when said performing condition for said first brake control has been determined to be satisfied during a performance of said adaptive cruise control; and
stop performing said adaptive cruise control when said acceleration override control is not being performed at said point in time.

In the configuration above, when the acceleration override control is being performed at the point in time when the performing condition for the first brake control has been determined to be satisfied during a performance of the ACC, the first brake control is not performed but the performance of the ACC (that is, a control including the acceleration override control as one aspect thereof) is continued.

The case where the acceleration override control is being performed at the point in time when the performing condition for the first brake control has been determined to be satisfied is also likely to be a case where the time-to-collision becomes less than the first threshold in the "situation where the driver does not consider oneself to be in the avoidance operation necessary situation". Specifically, this case corresponds to a case where the own vehicle approaches the preceding vehicle as a result of the driver trying to pass (overtake) the preceding vehicle by operating the steering wheel while performing the acceleration override control during the trailing of the preceding vehicle by the ACC, and the time-to-collision subsequently becomes less than the first threshold. According to the configuration above, in such a case, the first brake control is not performed but the performance of the ACC is continued. Therefore, the occurrence of the situation where the first brake control is performed, and the ACC is stopped contrary to the driver's expectation can be suppressed more, and the possibility of giving a strange and annoying feeling to the driver can be more reduced.

In another aspect of the present disclosure,
the electric control unit is configured to:
perform said first brake control when said time-to-collision is less than said first threshold and more than or equal to a second threshold smaller than said first threshold;
determine that a performing condition for a second brake control which applies a second braking force greater than said first braking force to said own vehicle is satisfied when said time-to-collision is less than said second threshold so as to perform said second brake control; and
stop performing said adaptive cruise control when said second brake control is started during a performance of said adaptive cruise control.

In the configuration above, the performance of the ACC is stopped when the performing condition for the second brake control has been determined to be satisfied during the performance of the ACC and thereafter the second brake control is started. The second brake control herein is a control which applies the second braking force greater than the first braking force when the own vehicle is approaching the target object closer than when the first brake control is performed. Therefore, the second brake control can be said to be a control which is performed when there is a higher necessity of an avoidance operation compared to the first brake control. In general, the driver does not expect the ACC to be continued when there is a high necessity of the avoidance operation. Thus, according to the configuration above, it becomes possible to surely ensure a deceleration amount by performing the second brake control, maintaining the possibility of giving a strange and annoying feeling to the driver low.

In another aspect of the present disclosure, the electric control unit is configured to change said second threshold (TTCth3) in a case when a target object, said time-to-collision (TTC) thereof being less than said first threshold (TTCth1), is said preceding vehicle (200) in such a manner that said second threshold (TTCth3) becomes smaller as a lap rate (LR) becomes low, said lap rate (LR) being a value obtained by dividing a length (L) by which said own vehicle (100) overlaps with said preceding vehicle (200) in a vehicle width direction of said own vehicle (100) when assuming that said own vehicle (100) collides with said preceding vehicle (200), by a vehicle width (W) of said own vehicle (100).

In the configuration above, even though the time-to-collision to the preceding vehicle becomes shorter (that is, even though the own vehicle approaches the preceding vehicle closer), as the lap rate becomes lower, the first brake control becomes more difficult to be performed and the ACC becomes easier to be continued. It is highly likely that as the lap rate becomes lower, a distance to the preceding vehicle becomes shorter for a purpose of the own vehicle passing the preceding vehicle or the driver of the own vehicle avoiding a collision with the preceding vehicle by the steering wheel operation. Therefore, according to the configuration above, a possibility that the first brake control is performed and the ACC is stopped contrary to the driver's expectation can be further reduced.

Second vehicle control apparatus (hereinafter, also referred to as a "second apparatus") according to the present disclosure is applied to an own vehicle (100), and comprises:
an electric control unit configured to:
perform, as an adaptive cruise control, a preceding vehicle trailing control which makes said own vehicle (100) trail a preceding vehicle (200) which is a vehicle traveling ahead of said own vehicle (100) by calculating a target acceleration based on a distance to said preceding vehicle (200) and a relative speed with respect to said preceding vehicle (200);
perform an acceleration control for accelerating said own vehicle (100) and a deceleration control for decelerating said own vehicle (100) so that an acceleration of said own vehicle (100) coincides with said target acceleration;
calculate a time-to-collision (TTC) to a target object positioned in a predetermined region including a traveling direction of said own vehicle (100) based on a distance to said target object and a relative speed of said target object; and
determine that a performing condition for a first brake control which automatically applies a predetermined first braking force to said own vehicle (100) is satisfied when said time-to-collision (TTC) is less than a predetermined first threshold (TTCth1, TTCth2) so as to perform said first brake control.

The electric control unit is configured to:
stop performing said adaptive cruise control in a case where said first brake control is started during a performance of said adaptive cruise control; and
automatically resume said adaptive cruise control when said first brake control started during a performance of said adaptive cruise control is finished in a case where said deceleration control is being performed at a point in time when said performing condition for said first brake control has been determined to be satisfied.

In the second apparatus, the performance of the ACC is stopped in a case where the performing condition for the first brake control has been determined to be satisfied during the performance of the adaptive cruise control (ACC) and thereafter the first brake control is started. Besides, the ACC (that is, a control including the preceding vehicle trailing control as one aspect thereof) is automatically resumed when the first brake control started during the performance of the ACC is finished in a case where the deceleration control by the ACC is being performed at a point in time when the performing condition for the first brake control has been determined to be satisfied.

The performing condition for the first brake control is determined to be satisfied when the time-to-collision to the target object is less than the first threshold. The case where the deceleration control is being performed by the ACC at the point in time when the performing condition for the first brake control has been determined to be satisfied is highly likely to be a case where the time-to-collision becomes less than the first threshold in the "situation where the driver does not consider oneself to be in the avoidance operation necessary situation" or in the "situation where the driver recognizes (considers) oneself to be in the avoidance operation necessary situation, however, the driver has an intension to avoid a collision by the steering wheel operation instead of the brake operation". That is, it is highly likely that the driver does not expect the performance of the ACC to continue to be stopped also after the first brake control is finished. According to the second apparatus, in such a case, the ACC is automatically resumed after the first brake control is finished. Therefore, an occurrence of a situation where the ACC continues to be stopped after the first brake control is stopped contrary to the driver's expectation can be suppressed, and a possibility of giving a strange and annoying feeling to the driver can be reduced.

In another aspect of the present disclosure,
the electric control unit is configured to:
perform, as said adaptive cruise control, an acceleration override control which accelerates said own vehicle (100) in response to an accelerator operation by a driver of said own vehicle (100) when a required acceleration based on said accelerator operation is greater than said target acceleration; and
automatically resume said adaptive cruise control when said first brake control started during a performance of said adaptive cruise control is finished in a case where said acceleration override control is being performed at said point in time when said performing condition for said first brake control has been determined to be satisfied.

In the configuration above, the ACC (that is, a control including the acceleration override control as one aspect thereof) is resumed automatically when the first brake control started during the performance of the ACC is finished in a case where the acceleration override control is being performed at the point in time when the performing condition for the first brake control has been determined to be satisfied.

The case where the acceleration override control is being performed at the point in time when the performing condition for the first brake control has been determined to be satisfied is also likely to be a case where the time-to-collision becomes less than the first threshold in the "situation where the driver does not consider oneself to be in the avoidance operation necessary situation". Specifically, this case corresponds to a case where the own vehicle approaches the preceding vehicle as a result of the driver trying to pass (overtake) the preceding vehicle by operating the steering wheel while the acceleration override control being performed during the trailing of the preceding vehicle by the ACC, and the time-to-collision subsequently becomes less than the first threshold. According to the configuration above, in such a case, the ACC is automatically resumed after the first brake control is finished. Therefore, the occurrence of the situation where the ACC continues to be stopped after the first brake control is finished contrary to the driver's expectation can be suppressed more, and the possibility of giving a strange and annoying feeling to the driver can be reduced more.

In another aspect of the present disclosure,
the electric control unit is configured to:
  perform said first brake control when said time-to-collision (TTC) is less than said first threshold (TTCth1, TTCth2) and more than or equal to a second threshold (TTCth3, TTCth4) smaller than said first threshold (TTCth1, TTCth2);
  determine that a performing condition for a second brake control which applies a second braking force greater than said first braking force to said own vehicle (100) is satisfied when said time-to-collision (TTC) is less than said second threshold (TTCth3, TTCth4) so as to perform said second brake control;
  stop performing said adaptive cruise control when said second brake control is started during a performance of said adaptive cruise control; and
  continue stopping a performance of said adaptive cruise control when said second brake control started during a performance of said adaptive cruise control is finished.

In the configuration above, the performance of the ACC is stopped when the performing condition for the second brake control has been determined to be satisfied during the performance of the ACC and thereafter the second brake control is started. Besides, after the second brake control is finished, the performance of the ACC continues to be stopped (is not resumed). The second brake control herein is a control which applies the second braking force greater than the first braking force when the own vehicle is approaching the target object closer than when the first brake control is performed. Therefore, the second brake control can be said to be a control which is performed when there is a higher necessity of an avoidance operation compared to the first brake control. In general, the driver does not expect the ACC to be resumed when there is a high necessity of the avoidance operation. Thus, according to the configuration above, it becomes possible to surely ensure a deceleration amount by performing the second brake control, maintaining the possibility of giving a strange and annoying feeling to the driver low.

In another aspect of the present disclosure,
the electric control unit is configured to change said second threshold (TTCth3) in a case when a target object, said time-to-collision (TTC) thereof being less than said first threshold (TTCth1), is said preceding vehicle (200) in such a manner that said second threshold (TTCth3) becomes smaller as a lap rate (LR) becomes low, said lap rate (LR) being a value obtained by dividing a length (L) by which said own vehicle (100) overlaps with said preceding vehicle (200) in a vehicle width direction of said own vehicle (100) when assuming that said own vehicle (100) collides with said preceding vehicle (200), by a vehicle width of said own vehicle (100).

In the configuration above, even though the time-to-collision to the preceding vehicle becomes shorter (that is, even though the own vehicle approaches the preceding vehicle closer), as the lap rate becomes lower, the ACC becomes easier to be resumed after the first brake control is finished. It is highly likely that as the lap rate becomes lower, a distance to the preceding vehicle becomes shorter for a purpose of the own vehicle passing the preceding vehicle or the driver of the own vehicle avoiding a collision with the preceding vehicle by the steering wheel operation. Therefore, according to the configuration above, a possibility that the ACC continues to be stopped after the first brake control is finished contrary to the driver's expectation can be further reduced.

In the above description, references used in the following descriptions regarding embodiments are added with parentheses to the elements of the present disclosure, in order to assist in understanding the present disclosure. However, those references should not be used to limit the scope of the present disclosure.

DESCRIPTION OF THE EMBODIMENT

First Embodiment

Figure 1:
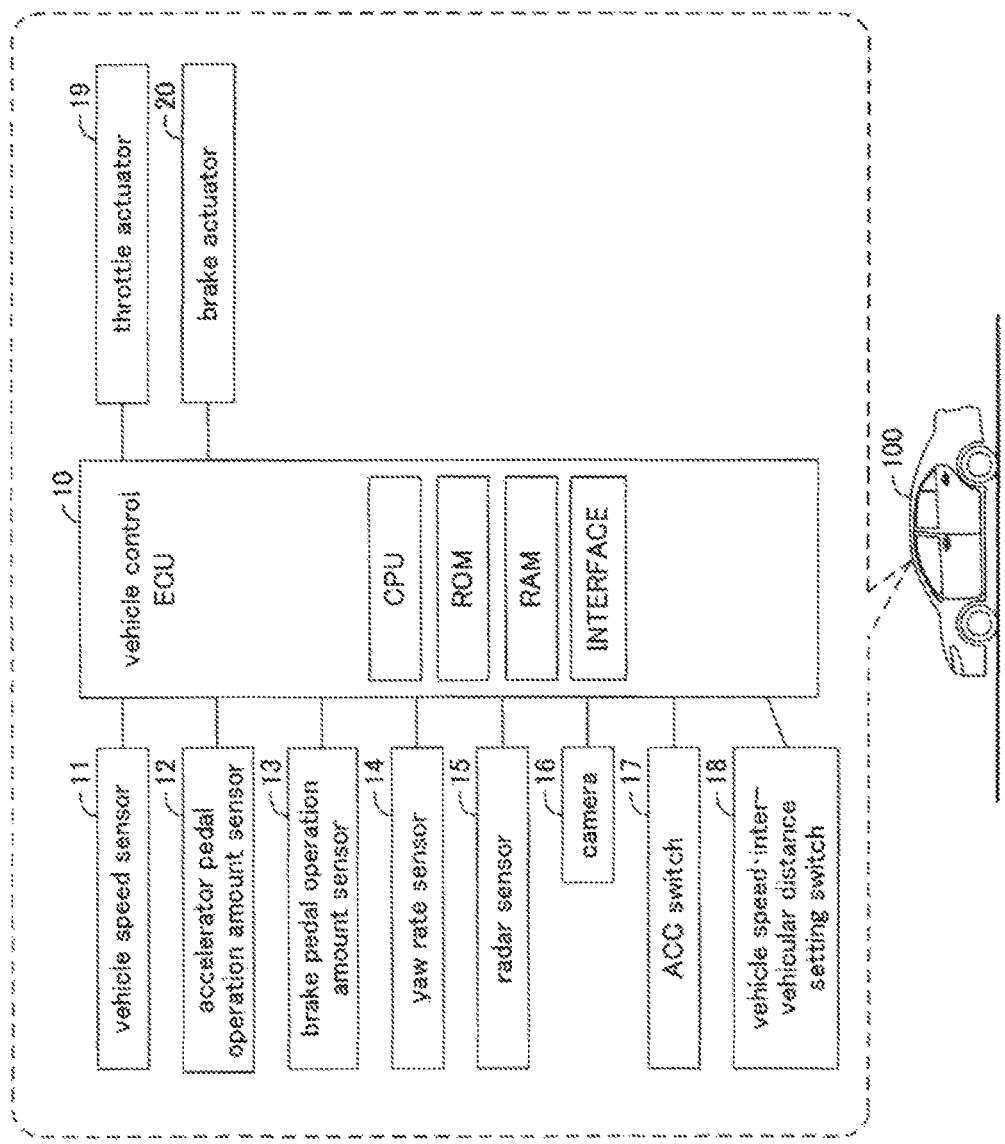
FIG. 1 is diagram showing a vehicle control apparatus (hereinafter, referred to as a "first embodiment apparatus") according to a first embodiment of the present disclosure and a vehicle to which the first embodiment apparatus is applied.

A vehicle control apparatus (a first embodiment apparatus) according to a first embodiment of the present disclosure will be described below, referring to FIG. 1 through FIG. 9. The first embodiment apparatus is applied to a vehicle 100 shown in FIG. 1. The vehicle 100 is an automobile, a power source thereof being an engine (illustration omitted). As shown in FIG. 1, the first embodiment apparatus comprises a vehicle control ECU 10 (hereinafter, also referred to as "ECU 10").

ECU is an abbreviation of Electric Control Unit, and the ECU 10 is an electronic control circuit having a microcomputer including CPU, ROM, RAM, an interface I/F, and the like as main components. The CPU is configured to realize/perform various functions mentioned later by executing instructions (i.e., programs or routines) stored in a memory (the ROM).

To the ECU 10, a vehicle speed sensor 11, an accelerator pedal operation amount sensor 12, a brake pedal operation amount sensor 13, a yaw rate sensor 14, a radar sensor 15, a camera 16, an adaptive cruise control switch (hereinafter, also referred to as an "ACC switch") 17, a vehicle speed•inter-vehicular distance setting switch 18, a throttle actuator 19 and a brake actuator 20 are connected. It should be noted that although the vehicle 100 comprises a plurality of sensors for detecting a driving state of the vehicle 100 other than the sensors mentioned above, only sensors related to a configuration of the vehicle control apparatus disclosed in the present specification are described in the present embodiment.

The vehicle speed sensor 11 is configured to detect a speed of the vehicle 100 (a vehicle speed) and output a signal representing the speed to the ECU 10.

The accelerator pedal operation amount sensor 12 is configured to detect an operation amount of an accelerator pedal (illustration omitted), and output to the ECU 10 a signal representing the operation amount (hereinafter, referred to as an "accelerator pedal operation amount").

The brake pedal operation amount sensor 13 is configured to detect an operation amount of a brake pedal (illustration omitted), and output to the ECU 10 a signal representing the operation amount (hereinafter, referred to as a "brake pedal operation amount").

The yaw rate sensor 14 is configured to detect an angular speed (a yaw rate) of the vehicle 100, and output a signal representing the yaw rate to the ECU 10.

The radar sensor 15 is configured to transmit a radio wave toward a front direction (that is, a diagonally front left direction, a forward direction and a diagonally front right direction) of the vehicle 100. When there exist a movable object and a building (described later) in a region which the radio wave (hereinafter, referred to as a "transmitted wave") reaches, the transmitted wave is reflected by the object and the building. The radar sensor 15 is configured to receive the reflected transmitted wave (hereinafter, referred to as a "reflected wave"). The radar sensor 15 is configured to output to the ECU 10 a signal representing the transmitted wave and a signal representing the reflected wave. It should be noted that specifically, the movable object means an object such as an other vehicle, a pedestrian, a bicycle and the like, and the building means a guard rail, a wall provided along a side of an expressway, a median strip and the like.

The camera 16 is configured to photograph a front of the vehicle 100, and output a signal representing an image data photographed to the ECU 10.

The ACC switch 17 is provided near a driver's seat, and is operated by a driver. When the ACC switch 17 is turned on, a signal for switching a traveling mode of the vehicle 100 to a "traveling mode at a constant speed" or a "trailing mode" (both will be described later) is output to the ECU 10. At this time, the ACC switch 17 changes from an off state to an on state, and during the ACC switch 17 being on, outputs to the ECU 10 a signal representing that the ACC switch 17 is in the on state. When the ACC switch 17 is turned off, a signal for switching the traveling mode of the vehicle 100 to a normal traveling mode is output to the ECU 10. At this time, the ACC switch 17 changes from the on state to the off state, and during the ACC switch 17 being off, outputs to the ECU 10 a signal representing that the ACC switch 17 is in the off state. It should be noted that the traveling mode at a constant speed is a traveling mode selected by the ACC switch 17 being turned on in a case when no preceding vehicle (that is, a vehicle existing ahead of the vehicle 100 on a same traffic lane as the vehicle 100) exists. The trailing mode is a traveling mode selected by the ACC switch 17 being on in a case when there exists a preceding vehicle.

The vehicle speed•inter-vehicular distance setting switch 18 is provided near the driver's seat, and is operated by the driver. When a vehicle speed and an inter-vehicular distance are set by the driver adjusting the vehicle speed•inter-vehicular distance setting switch 18, signals representing these vehicle speed and inter-vehicular distance are output to the ECU 10 as signals representing a set vehicle speed and a set inter-vehicular distance, respectively. The set vehicle speed herein is a vehicle speed at which the vehicle 100 maintains when the traveling mode of the vehicle 100 is the traveling mode at a constant speed. The set inter-vehicular distance herein is an inter-vehicular distance with the preceding vehicle which the vehicle 100 maintains, traveling at a vehicle speed less than or equal to the set vehicle speed when the traveling mode of the vehicle 100 is the trailing mode. It should be noted that a configuration where a vehicle-to-vehicle time is set instead of the inter-vehicular distance may be adopted. In this case, the set inter-vehicular distance can be calculated by multiplying the set vehicle-to-vehicle time by the vehicle speed.

The throttle actuator 19 is an apparatus for changing a throttle valve opening by driving a throttle valve provided at an engine intake duct of the vehicle 100. The ECU 10 operates the throttle actuator 19 based on the accelerator pedal operation amount detected by the accelerator pedal operation amount sensor 12 and a driving state amount (for example, an engine rotating speed) detected by an other engine state amount sensor (illustration omitted) of the vehicle 100. When the ECU 10 operates the throttle actuator 19, an acceleration of the vehicle 100 changes since a generated torque and an output of the engine changes.

The brake actuator 20 is provided in a hydraulic circuit between a master cylinder to compress operating fluid with a depression force of the brake pedal and a friction brake mechanism provided at each of front and rear wheels of the vehicle 100. Each of the friction brake mechanism operates a wheel cylinder with operating fluid supplied from the brake actuator 20, and thereby presses a corresponding brake pad onto a corresponding brake disc provided at each of the front and rear wheels to generate a hydraulic braking force. The brake actuator 20 is a known actuator for adjusting a hydraulic pressure supplied to the wheel cylinder, and supplies to the wheel cylinder a hydraulic pressure in response to an instruction from the ECU 10 to generate a braking force for each of the wheels.

The ECU 10 operates the brake actuator 20 based on the brake pedal operation amount detected by the brake pedal operation amount sensor 13 and a driving state amount detected by an other driving state amount sensor (illustration omitted) of the vehicle 100. When the ECU 10 operates the brake actuator 20, a deceleration of the vehicle 100 changes since a braking force is applied to each of the front and rear wheels.

<Summary of Operation of the First Embodiment Apparatus>

Next, a summary of operation of the first embodiment apparatus will be described. The first embodiment apparatus adopts a pre-crash safety system (PCS) and determines whether or not to perform a pre-crash brake control (hereinafter, also referred to as a "PCBC") every time a predetermined calculation interval elapses. The PCBC of the first embodiment apparatus is a control to apply a predetermined braking force to the vehicle 100 in a case when there exists a target object, a time-to-collision thereof being less than a predetermined time threshold in a predetermined region including a traveling direction of the vehicle 100.

There are two types in the PCBC; one is a pre brake control which applies a regular braking force and an other is a light pre brake control which applies a light braking force lighter than the regular braking force. Hereinafter, the pre brake control is referred to as a "PBC" and the light pre brake control is referred to as a "LPBC". The PBC is performed when a collision risk is relatively high and the LPBC is performed when the collision risk is relatively low. It should be noted that the regular braking force and the light braking force correspond to one example of a "second braking force" and a "first braking force", respectively. Besides, the PBC and the LPBC correspond to one example of a "second brake control" and a "first brake control", respectively.

In addition, the first embodiment apparatus determines whether or not the ACC switch 17 is in the on state every time the predetermined calculation interval elapses, and when the ACC switch 17 is in the on state, performs an adaptive cruise control (hereinafter, also referred to as an "ACC"). There are two types in the ACC, one is a control at the traveling mode at a constant speed, and an other is a control at the trailing mode. The present disclosure disclosed in the present specification is based on a premise that the first embodiment apparatus performs the ACC at the trailing mode (that is, the vehicle 100 trails the preceding vehicle), and therefore hereinafter, a case where the first embodiment apparatus performs the ACC at the trailing mode will be mainly described. The ACC at the trailing mode is a control which performs an acceleration control or a deceleration control of the vehicle 100 in such a manner that the vehicle 100 trails the preceding vehicle at a vehicle speed less than or equal to the set vehicle speed, maintaining an inter-vehicular distance with the preceding vehicle as the set inter-vehicular distance. It should be noted that the ACC at the trailing mode corresponds to one example of a "preceding vehicle trailing control".

The first embodiment apparatus determines whether "to continue the ACC without performing the PCBC" or "to perform the PCBC and stop the ACC" when having determined that the performing condition for the PCBC is satisfied during a performance of the ACC at the trailing mode (ACC determination). That is, the first embodiment apparatus does not always perform the PCBC even when having determined that the performing condition for the PCBC is satisfied. Now, if the ACC is resumed automatically after the performance of the PCBC, there is a possibility that the driver overestimates a performance of the first embodiment apparatus and does not intervene in a brake control after the performance of the PCBC. Therefore, in a situation where the collision risk is expected to be relatively high, it is desired to prompt the driver to surely intervene in the brake control by stopping the performance of the ACC after the performance of the PCBC. Thus, when a type of the PCBC is the PBC (that is, a control performed when the collision risk is relatively high), the first embodiment apparatus determines that the PBC alone is insufficient, and performs the PBC and stops the performance of the ACC.

On the other hand, in a configuration where the PCBC is performed and the performance of the ACC is always stopped, if the performing condition for the PCBC happens to be satisfied contrary to a driver's intension, the PCBC will be performed and the ACC will be stopped contrary to a driver's expectation, which is not desirable.

Figure 4A:
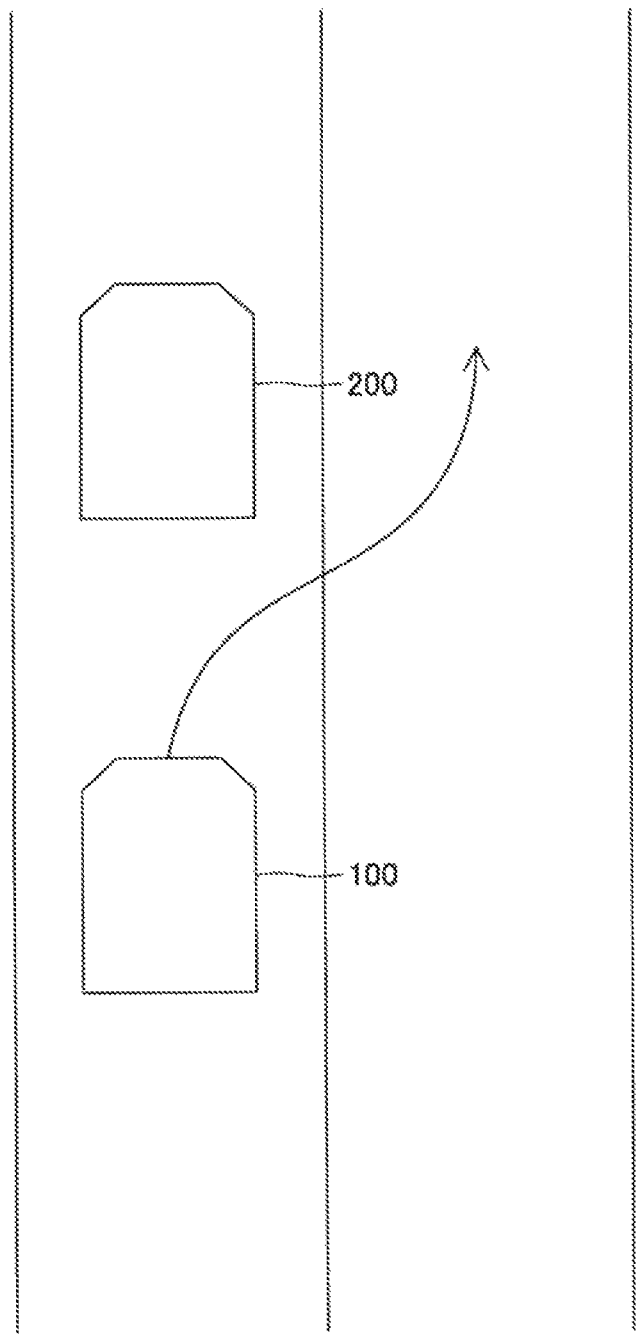
FIG. 4A is a diagram showing a situation where an own vehicle changes a traffic lane by a steering wheel operation in order to pass a preceding vehicle during a deceleration control by an ACC.
Figure 4B:
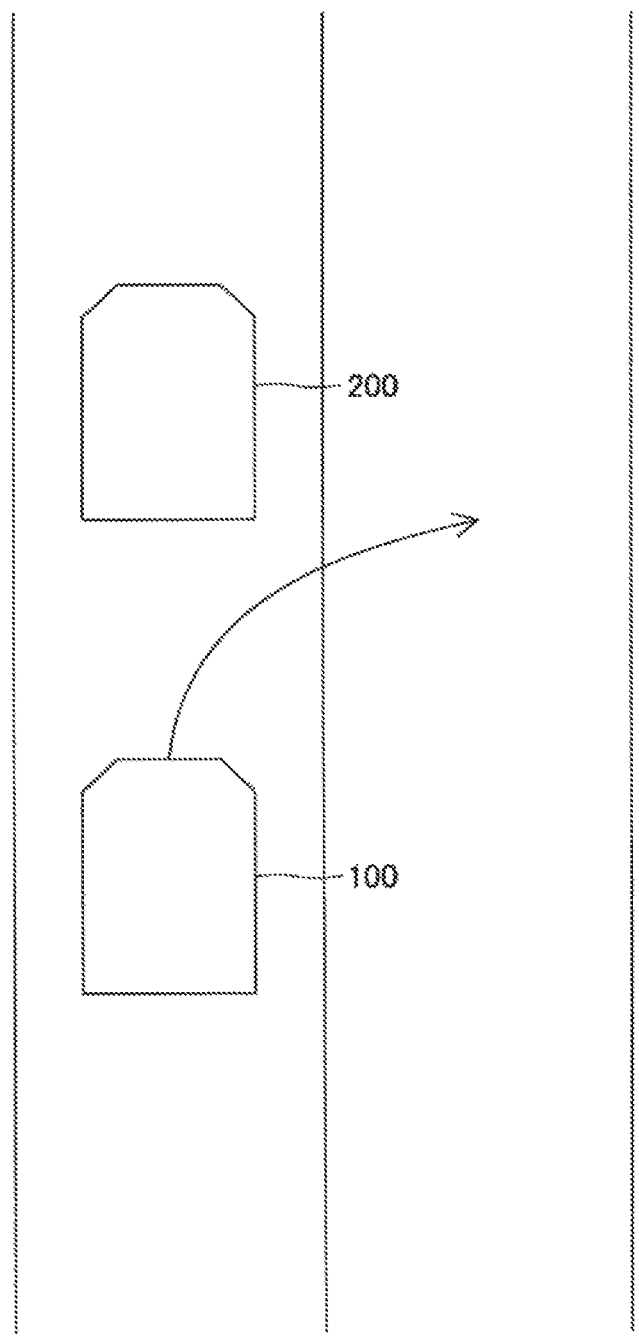
FIG. 4B is a diagram showing a situation where the own vehicle is trying to avoid a collision with the preceding vehicle by the steering wheel operation during the deceleration control by the ACC.
Figure 4C:
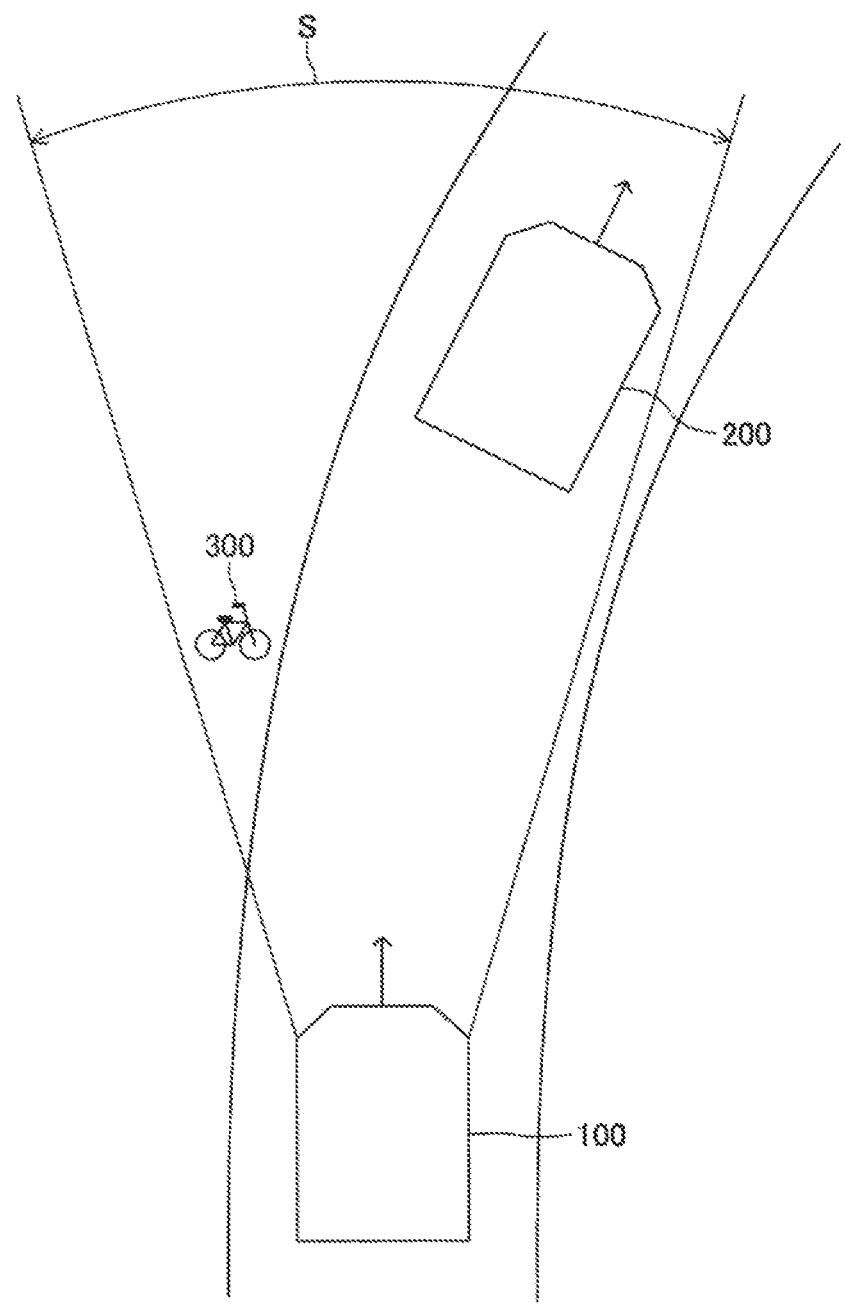
FIG. 4C is a diagram showing a situation where there exists a bicycle or a pedestrian in a predetermined region (a detection region of a target object subject to a PCBC) including a traveling direction of the own vehicle during the deceleration control by the ACC on a curved road.

FIG. 4A through FIG. 4C show examples of situations where a possibility that the performing condition for the PCBC happens to be satisfied contrary to the driver's intension is high. In FIG. 4A and FIG. 4B, the vehicle 100 is performing the deceleration control by the ACC since a preceding vehicle 200 decelerated in a midst of the vehicle 100 trailing the preceding vehicle 200. In FIG. 4A, when the driver operates the steering wheel for a purpose of passing the preceding vehicle 200 and changes a traffic lane along a path shown by an arrow of FIG. 4A, it is highly likely that the performing condition for the PCBC is satisfied since the vehicle 100 temporarily approaches the preceding vehicle 200. In FIG. 4B, when the driver operates the steering wheel in order to try to avoid a collision by traveling along a path shown by an arrow of FIG. 4B, it is highly likely that the performing condition for the PCBC is satisfied since the vehicle 100 temporarily approaches the preceding vehicle 200. On the other hand, in FIG. 4C, the vehicle 100 is performing the deceleration control by the ACC since the preceding vehicle 200 approached a curved road and thus decelerated in a midst of the vehicle 100 trailing the preceding vehicle 200. As shown in FIG. 4C, a bicycle 300 existing beside the curved road is included in a predetermined region S (a detection region of a target object subject to the PCBC) including a traveling direction of the vehicle 100 (refer to an arrow in FIG. 4C). It is highly likely that the performing condition for the PCBC is satisfied when the vehicle 100 approaches the bicycle 300 due to a road shape.

As is obvious from a description above, in a "case where the performing condition for the PCBC happens to be satisfied contrary to the driver's intension", the collision risk is expected to be relatively low. Therefore, when a type of the PCBC is the LPBC (that is, a control performed when the collision risk is relatively low), the first embodiment apparatus continues the ACC without performing the LPBC if the deceleration control by the ACC is being performed at a point in time when the performing condition for the LPBC has been determined to be satisfied, whereas the first embodiment apparatus performs the LPBC and stops the ACC if the deceleration control by the ACC is not being performed (that is, the acceleration control by the ACC or the acceleration override control is being performed) at the point in time when the performing condition for the LPBC has been determined to be satisfied. That is, assuming that the performing condition for the LPBC has been determined to be satisfied in the examples of FIG. 4A through FIG. 4C, the deceleration control by the ACC is being performed at a point in time when the determination has been made, and therefore the LPBC will not be performed but the ACC will be continued. Therefore, it can be prevented that the LPBC is performed and the performance of the ACC is stopped contrary to the driver's expectation. As is clear from the description above, an action that "the deceleration control by the ACC is being performed at the point in time when the performing condition for the PCBC has been determined to be satisfied" is included in one of conditions for determining whether to continue the ACC or to stop the ACC. This is because if the ACC is the acceleration control (including an acceleration of zero) or the acceleration override control, a deceleration amount based on the ACC cannot be ensured unlike a case where the ACC is the deceleration control, which may cause the deceleration amount based on the LPBC alone to be insufficient even in a situation with a low collision risk and therefore it is desirable to prompt the driver to intervene in the brake control.

Hereinafter, a description about the PCBC, the ACC and an ACC determination process will be made in detail based on the summary stated above. It should be noted that hereinafter, a period between when a non-illustrated engine switch (an ignition key switch) of the vehicle 100 is turned on and when this engine switch is turned off will be also referred to as an "engine on period".

<Detail of Operation of the First Embodiment Apparatus>
A. PCBC
[Acquisition of Own Vehicle Information]

First, a description about the PCBC will be made. The ECU 10 acquires information showing the vehicle speed, the accelerator pedal operation amount, the brake pedal operation amount, the yaw rate, the state of the ACC switch 17 and the state of the vehicle speed•inter-vehicular distance setting switch 18 (that is, the driving state of the vehicle 100) as own vehicle information based on the signals received from the sensors 11 to 14 and the switches 17 and 18 every time the predetermined calculation interval elapses during the engine on period. Besides, the ECU 10 calculates the traveling direction of the vehicle 100 based on the vehicle speed and the yaw rate.

[Acquisition of Target Object Information]

The ECU 10 determines whether or not there exist any movable objects (hereinafter, simply referred to as an "object") around the vehicle 100 from a signal received from the radar sensor 15 and an image data based on a signal received from the camera 16 every time the predetermined calculation interval elapses during the engine on period. When the ECU 10 has determined that there exists an object, the ECU 10 calculates a distance from the vehicle 100 to the object and an azimuth with respect to the vehicle 100. In addition, the ECU 10 calculates the relative speed of the object with respect to the vehicle 100 based on a speed of the object and the speed of the vehicle 100.

The ECU 10 fuses the signal of the object received from the radar sensor 15 and the image data of that object obtained from the camera 16 to generate a fusion object. Specifically, the ECU 10 identifies a longitudinal position of the fusion object using the distance to the object and the relative speed thereof calculated based on the signal received from the radar sensor 15, and identifies a lateral position of the fusion object using a lateral width and a lateral position of the object calculated based on the image data obtained from the camera 16. The ECU 10 stores in the memory (ROM) the patterned data of objects such as a vehicle, a pedestrian, a bicycle and the like in advance. The ECU 10 performs a pattern matching for the image data obtained from the camera 16 using this patterned data and thereby recognizes to which object pattern among a vehicle, a pedestrian or a bicycle an object shown by this image data corresponds.

Hereinafter, a fusion object which satisfies following conditions will be defined as a "target object". The conditions are as follows:

A fusion object is either one of a vehicle, a pedestrian or a bicycle which is positioned in the predetermined region (a region defined by an angle range) including the traveling direction of the vehicle 100.

A relative speed of a fusion object in a vehicle width direction (a direction perpendicular to the traveling direction of the vehicle 100) is in a predetermined relative speed range including zero.

That is, for example, even though a fusion object recognized as a bicycle by the pattern matching is positioned in the predetermined region, this fusion object does not correspond to a target object if a relative speed thereof in the vehicle width direction is out of the predetermined relative speed range. In addition, a fusion object with speed thereof being zero is also included as a target object. The ECU 10 acquires, as target object information, information showing the distance from the vehicle 100 to the target object, the azimuth of the target object with respect to the vehicle 100, the relative speed of the target object with respect to the vehicle 100 and to which object pattern the target object corresponds among a vehicle, a pedestrian and a bicycle. It should be noted that although a scanning region of the radar sensor 15 and a photographing region of the camera 16 are set as wider regions than the predetermined region mentioned above, a configuration is not limited thereto. The scanning region and the photographing region may be substantially same as the predetermined region mentioned above.

[Calculation of a Time-to-Collision]

The ECU 10 calculates a time-to-collision (hereinafter, also referred to as a "TTC") to each of the fusion objects detected as target objects every time the predetermined calculation interval elapses during the engine on period. The TTC to each target object can be calculated by dividing a distance to each target object by a relative speed of the vehicle 100 with respect to each target object. When there are plurality of target objects, the ECU 10 compares the TTC to each target object to select among them one target object with a minimum TTC, and determines whether or not to determine the PCBC (described later) against the target object selected.

The ECU 10 determines whether or not the performing condition for performing the PCBC against the selected target object is satisfied every time the predetermined calculation interval elapses during the engine on period. When the ECU 10 has determined that the performing condition is satisfied, the ECU 10 determines whether to continue the ACC without performing the PCBC or whether to perform the PCBC and stop the ACC. As mentioned earlier, there are two types in the PCBC; one is the PBC and the other is the LPBC. The performing conditions for these two controls are different, depending on whether a target object is an other vehicle (typically, a preceding vehicle) or a pedestrian/a bicycle. Therefore, hereinafter, a case where the target object is the other vehicle and a case where the target object is the pedestrian or the bicycle will be separately described regarding the PBC and the LPBC.

[PBC in a Case when the Target Object is an Other Vehicle]

First, a description about the PBC in a case when the target object is the other vehicle will be made. There are two methods in avoiding a collision with the other vehicle by a driving operation by the driver oneself; one is a collision avoidance by a brake operation by the driver (hereinafter, also referred to as a "brake avoidance") and an other is a collision avoidance by a steering wheel operation by the driver (hereinafter, also referred to as a "steering avoidance"). It is desirable that the PBC is performed when only the brake operation or the steering operation by the driver may be difficult to avoid a collision (that is, when the collision risk is relatively high).

Figure 2:
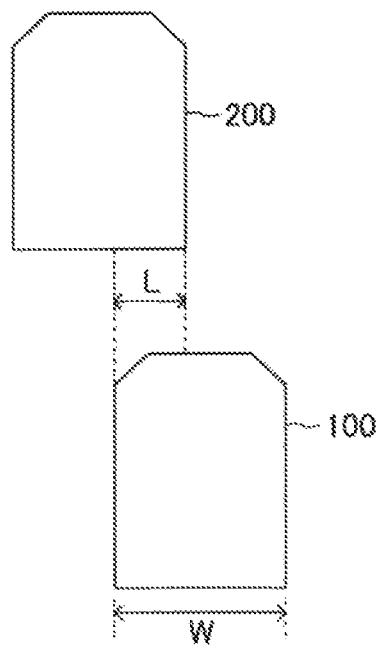
FIG. 2 is a diagram for describing a lap rate.
Figure 3:
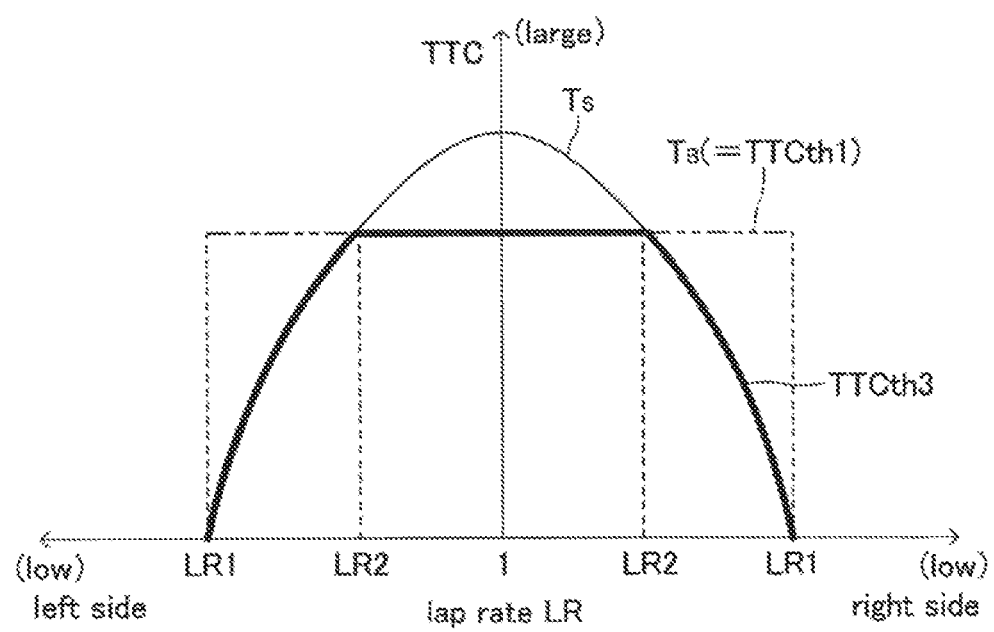
FIG. 3 is a graph showing a relationship between a brake avoidance limit time, a steering avoidance limit time and the lap rate.

FIG. 3 is a graph showing a relationship between a brake avoidance limit time $T_B$, a steering avoidance limit time $T_S$ and a lap rate LR, and this graph is stored in the memory (ROM). The brake avoidance limit time $T_B$ herein is a limit time for the driver to be able to avoid a collision with the other vehicle by the brake operation. The steering avoidance limit time $T_S$ is a limit time for the driver to be able to avoid a collision with the other driver by the steering wheel operation. The lap rate LR is, as shown in FIG. 2, an index showing an overlapping degree of the vehicle 100 with the other vehicle 200 in the vehicle width direction. The lap rate LR can be calculated by dividing a length L by which the vehicle 100 overlaps with the other vehicle 200 in the vehicle width direction of the vehicle 100 by a vehicle width W of the vehicle 100.

In FIG. 3, a vertical axis represents the TTC and a horizontal axis represents the lap rate LR. Values of the vertical axis become smaller downwardly, and values of the lateral axis become smaller outwardly from a center. A right side part of the lateral axis represents the lap rate LR of when the vehicle 100 is positioned on a right side with respect to the other vehicle, and a left side part of the lateral axis represents the lap rate LR of when the vehicle 100 is positioned on a left side with respect to the other vehicle.

As shown in FIG. 3, although the brake avoidance limit time $T_B$ is constant regardless of the lap rate LR, the steering avoidance limit time $T_S$ changes with the lap rate LR. A value of the steering avoidance limit time $T_S$ is the largest when the lap rate LR is 1 and becomes smaller as the lap rate LR becomes lower. When the lap rate LR satisfies LR≥LR2 (Hereinafter, the lap rate LR which satisfies this relationship is also referred to as a "high lap".), a time necessary to avoid a collision by the brake operation can be suppressed to a time less than or equal to a time necessary to avoid the collision by the steering wheel operation since a relationship of the brake avoidance limit time $T_B$≤the steering avoidance limit time $T_S$ is satisfied. On the other hand, when the lap rate LR satisfies LR1≤LR<LR2 (Hereinafter, the lap rate LR which satisfies this relationship is also referred to as a "low lap".), a time necessary to avoid a collision by the steering wheel operation can be suppressed to a time less than a time necessary to avoid the collision by the brake operation since a relationship of the steering avoidance limit time $T_S$<the brake avoidance limit time $T_B$ is satisfied.

On the other hand, this can be rephrased as follows.

It is highly likely that only the brake operation by the driver is insufficient to avoid a collision with the other vehicle when the TTC is less than the brake avoidance limit time $T_B$ in a case of the high lap.

It is highly likely that only the steering wheel operation by the driver is insufficient to avoid a collision with the other vehicle when the TTC is less than the steering avoidance limit time $T_S$ in a case of the low lap.

That is, the collision risk is relatively high in the above two cases.

Therefore, when the TTC is less than the brake avoidance limit time $T_B$ in a case of the high lap and when the TTC is less than the steering avoidance limit time $T_S$ in a case of the low lap (that is, when values of the lap rate LR and the TTC are both positioned within a region surrounded by a thick line and the horizontal axis in FIG. 3), the ECU 10 determines that the performing condition for the PBC which applies the regular braking force is satisfied to perform the PBC. It should be noted that the brake avoidance limit time $T_B$ corresponds to one example of a "first threshold". Hereinafter, the brake avoidance limit time $T_B$ is also referred to as a "first time threshold TTCth1".

[LPBC in a Case when the Target Object is an Other Vehicle]

Next, a description about the LPBC in a case when the target object is the other vehicle will be made. In a case of the low lap, when the TTC is more than or equal to the steering avoidance limit time $T_S$ and less than the brake avoidance limit time $T_B$, the collision risk is relatively low since the steering avoidance is possible although there is still some collision possibility because the brake avoidance is difficult. Therefore, when the TTC is more than or equal to the steering avoidance limit time $T_S$ and less than the brake avoidance limit time $T_B$ in a case of the low lap (that is, when values of the lap rate LR and the TTC are both positioned within a region surrounded by a two-dot chain line, the thick line and a line parallel with the vertical axis, passing through a value of LR1 in FIG. 3), the ECU 10 determines that the performing condition for the LPBC which applies the light braking force is satisfied to perform the LPBC. That is, the ECU 10 performs two stages of the PCBC in a case of the low lap.

However, even though the LPBC is a control which only applies the light braking force, if the LPBC is performed when the driver has an intension to avoid a collision by the steering wheel operation, the LPBC may interfere with the driving operation by the driver, causing a strange or annoying feeling to the driver. In addition, when the vehicle 100 changes a traffic lane for a purpose of passing the other vehicle, the vehicle 100 may deviate in the vehicle width direction with respect to the other vehicle, temporarily approaching the other vehicle, and as a result, the lap rate LR may become low (that is, the low lap), and the TTC may become more than or equal to the steering avoidance limit time $T_S$ and less than the brake avoidance limit time $T_B$. In this case also, if the LPBC is performed, this control may be regarded as an unnecessary control, causing a strange or annoying feeling to the driver since the driver does not consider oneself to be in a situation where a collision avoidance with the other vehicle is necessary.

The situation as described above (that is, the situation where the driver does not consider oneself to be in a situation where a collision avoidance with the other vehicle is necessary) is likely to occur when following two conditions are satisfied.

(Condition 1) The performing condition for the LPBC is determined to be satisfied during a performance of the ACC.

(Condition 2) The deceleration control by the ACC is being performed at a point in time when the performing condition for the LPBC has been determined to be satisfied.

Therefore, the ECU 10 does not always perform the LPBC when having determined that the performing condition for the LPBC is satisfied, but does not perform the LPBC when the above two conditions 1 and 2 are satisfied. According to this configuration, a possibility that the LPBC is regarded as an unnecessary control by the driver can be lowered. Besides, in a case where it turned out that the driver was actually in the avoidance operation necessary situation even when the above two conditions were satisfied, a deceleration amount based on the deceleration control by the ACC can be ensured. Further, when at least one of the above two conditions are not satisfied, a deceleration amount based on the LPBC can be ensured.

It should be noted that the steering avoidance limit time $T_S$ in a case of the low lap corresponds to one example of a "second threshold". Hereinafter, LR1 and LR2 are also referred to as a "first lap rate threshold LRth1" and a "second lap rate threshold LRth2", respectively, and the steering avoidance limit time $T_S$ is also referred to as a "third time threshold TTCth3".

[PBC and LPBC in a Case when the Target Object is a Pedestrian or a Bicycle]

Subsequently, a description about the PBC and the LPBC in a case when the target object is the pedestrian or the bicycle will be made. When the target object is the pedestrian or the bicycle, the ECU 10 performs two stages of the PCBC. That is, when the TTC is less than a "time threshold of the PBC for a pedestrian/bicycle", the ECU 10 determines that the performing condition for the PBC is satisfied to perform the PBC, and when the TTC is more than or equal to the "time threshold of the PBC for a pedestrian/bicycle" and less than a "time threshold of the LPBC for a pedestrian/bicycle", the ECU 10 determines that the performing condition for the LPBC is satisfied to perform the LPBC. However, the ECU 10, as with the case when the target object is the other vehicle, does not always perform the LPBC when having determined that the performing condition for the LPBC is satisfied, but does not perform the LPBC when the above two conditions 1 and 2 are satisfied.

The "time threshold of the LPBC for a pedestrian/bicycle" and the "time threshold of the PBC for a pedestrian/bicycle" have both constant values, and the former time threshold is set to be a slightly larger value than the first time threshold TTCth1. It should be noted that the "time threshold of the LPBC for a pedestrian/bicycle" and the "time threshold of the PBC for a pedestrian/bicycle" correspond to one example of a "first threshold" and a "second threshold", respectively. Hereinafter, the "time threshold of the LPBC for a pedestrian/bicycle" and the "time threshold of the PBC for a pedestrian/bicycle" are referred to as a "second time threshold TTCth2" and a "fourth time threshold TTCth4", respectively.

[Setting of a PCBC Flag]

As is obvious from the description above, the ECU 10 determines that the performing condition for the PCBC is satisfied when the TTC is less than the first time threshold TTCth1 in a case where the target object is an other vehicle, and when the TTC is less than the second time threshold TTCth2 in a case where the target object is a pedestrian or a bicycle. On the other hand, the ECU 10 determines that the performing condition for the PCBC is not satisfied when the TTC is more than or equal to the first time threshold TTCth1 in a case where the target object is an other vehicle, and when the TTC is more than or equal to the second time threshold TTCth2 in a case where the target object is a pedestrian or a bicycle.

The information indicating whether or not the performing condition for the PCBC is satisfied is used when determining whether or not to perform the ACC determination (described later). Therefore, a PCBC flag which is a flag indicating this information is set in the first embodiment apparatus. The ECU 10 sets a value of the PCBC flag to 1 when having determined that the performing condition for the PCBC is satisfied, and sets the value of the PCBC flag to 0 when having determined that the performing condition for the PCBC is not satisfied. The ECU 10 uses the value of the PCBC flag when determining whether or not to perform the ACC determination.

[Setting of a LPBC Flag]

The ECU 10 determines, under a situation where the performing condition for the PCBC is satisfied, that the performing condition for the LPBC is satisfied when "the TTC is more than or equal to the third time threshold TTCth3 in a case of the low lap" in a case where the target object is an other vehicle, and when "the TTC is more than or equal to the fourth time threshold TTCth4" in a case where the target object is a pedestrian or a bicycle. On the other hand, the ECU 10 determines that the performing condition for the LPBC is not satisfied when the performing condition for the PCBC is not satisfied, or when the performing condition for the PBC (described later) is satisfied.

The ACC determination uses the information indicating whether or not the performing condition for the LPBC is satisfied. Therefore, an LPBC flag which is a flag indicating this information is set in the first embodiment apparatus. The ECU 10 sets a value of the LPBC flag to 1 when having determined that the performing condition for the LPBC is satisfied, and sets the value of the LPBC flag to 0 when having determined that the performing condition for the LPBC is not satisfied. The ECU 10 uses the value of the LPBC flag in the ACC determination.

[Setting of a PBC Flag]

The ECU 10 determines, under the situation where the performing condition for the PCBC is satisfied, that the performing condition for the PBC is satisfied to perform the PBC when "the TTC is less than the third time threshold TTCth3 in a case of the low lap, or in a case of the high lap" in a case where the target object is an other vehicle, and when "the TTC is less than the fourth time threshold TTCth4" in a case where the target object is a pedestrian or a bicycle. On the other hand, the ECU 10 determines that the performing condition for the PBC is not satisfied to not perform the PBC when the performing condition for the PCBC is not satisfied, or when the aforementioned performing condition for the LPBC is satisfied.

A PBC flag which is a flag indicating whether or not the PCBC is the PBC is set in the first embodiment apparatus. The ECU 10 sets a value of the PBC flag to 1 when having determined that the performing condition for the PBC is satisfied, and sets the value of the PBC flag to 0 when having determined that the performing condition for the PBC is not satisfied. That is, the value of the PBC flag is set to 0 when the value of the LPBC flag is set to 1 under a situation where the value of the PCBC flag has been set to 1, and the value of the LPBC flag is set to 0 when the value of the PBC flag is set to 1 under the aforementioned situation.

B. ACC

[State of the ACC Switch]

Next, a description about the ACC will be made. The ECU 10 determines whether or not the information indicating the state of the ACC switch 17 which is obtained as the own vehicle information shows the on state every time the predetermined calculation interval elapses during the engine on period. When the information shows the on state, the ECU 10 performs the ACC.

[Acquisition of Preceding Vehicle Information]

The ECU 10 determines whether or not there exists a preceding vehicle among fusion objects detected as target objects every time the predetermined calculation interval elapses during the engine on period. Specifically, the ECU 10 identifies a road shape based on a signal of a building received from the radar sensor 15 and an image data of that building obtained from the camera 16. Based on the road shape identified, the ECU 10 determines whether or not there exists an other vehicle ahead of the vehicle 100 on a traffic lane on which the vehicle 100 is traveling. The ECU 10 determines that there exists a preceding vehicle when there exists that other vehicle, and determines that there does not exist a preceding vehicle when there does not exist that other vehicle. The ECU 10 sets the traveling mode of the ACC to the trailing mode when having determined that there exists a preceding vehicle, and sets the traveling mode of the ACC to the traveling mode at a constant speed when having determined that there does not exist a preceding vehicle. The present disclosure disclosed in the present specification is based on a premise that the traveling mode is the trailing mode (that is, there exists a preceding vehicle), and therefore hereinafter, a description about the trailing mode will be made and a detailed description about the traveling mode at a constant speed will be omitted. The ECU 10 acquires a distance to the preceding vehicle and a relative speed as a preceding vehicle information.

[Calculation of a Target Acceleration]

When there exists a preceding vehicle, the ECU 10 calculates a target acceleration for trailing the preceding vehicle at a vehicle speed less than or equal to the set vehicle speed, maintaining the set inter-vehicular distance every time the predetermined calculation interval elapses during the engine on period. The set inter-vehicular distance and the set vehicle speed are determined based on the information acquired from the vehicle speed•inter-vehicular distance setting switch 18 as the own vehicle information. The target acceleration can be calculated by a "deviation ΔD between a distance to the preceding vehicle (an inter-vehicular distance) and the set inter-vehicular distance" and a "relative speed $V_R$ of the vehicle 100 with respect to the preceding vehicle". Specifically, the target acceleration Gtgt is calculated in accordance with a following equation. It should be noted that K1 and K2 are predetermined positive gains (coefficients).

$$Gtgt = K1 \cdot \Delta D + K2 \cdot V_R$$

The ECU 10 performs a control of the throttle actuator 19 (the acceleration control by the ACC) or a control of the brake actuator 20 (the deceleration control by the ACC) in such a manner that an acceleration of the vehicle 100 coincides with the target acceleration calculated. However, the target acceleration includes an upper limit acceleration and a lower limit acceleration (a negative deceleration) which have been set in advance, and the ECU 10 controls the throttle actuator 19 so that the acceleration of the vehicle 100 coincides with the upper limit acceleration when the target acceleration exceeds the upper limit acceleration, and controls the brake actuator 20 so that the acceleration of the vehicle 100 coincides with the lower limit acceleration when the target acceleration falls below the lower limit acceleration.

[Setting of an AC Deceleration Control Flag]

As is obvious from the description above, the ECU 10 performs the deceleration control by the ACC when the target acceleration is less than 0. The ACC determination uses the information indicating whether or not the deceleration control by the ACC is being performed. Therefore, an AC deceleration control flag which is a flag indicating this information is set in the first embodiment apparatus. The ECU 10 sets a value of the AC deceleration control flag to 1 when the deceleration control by the ACC is being performed, and sets the value of the AC deceleration control flag to 0 when the deceleration control by the ACC is not being performed (that is, when the acceleration control by the ACC (includes an acceleration of 0) is being performed). The ECU 10 uses the value of the AC deceleration control flag in the ACC determination.

[Setting of an Acceleration Override (AOR) Flag]

When the driver depresses the accelerator pedal during the trailing by the ACC, the ECU 10 calculates a required acceleration based on an accelerator operation by the driver based on the accelerator pedal operation amount, the vehicle speed, and the like. The ECU 10 determines whether or not this required acceleration exceeds the target acceleration calculated by the aforementioned method, and when this required acceleration exceeds the target acceleration, controls the throttle actuator 19 so that the acceleration of the vehicle 100 coincides with the required acceleration. This is a known control referred to as an acceleration override control (AORC). That is, when the required acceleration exceeds the target acceleration, the ECU 10 performs the AORC in preference to the trailing by the ACC. The ACC determination uses the information indicating whether or not the AORC is being performed. Therefore, an acceleration override (AOR) flag which is a flag indicating this information is set in the first embodiment apparatus. The ECU 10 sets a value of the AOR flag to 1 when the AORC is being performed, and sets the value of the AOR flag to 0 when the AORC is not being performed. The ECU 10 uses the value of the AOR flag in the ACC determination.

C. ACC Determination

Subsequently, a description about the ACC determination will be made. The ACC determination is processing for determining whether "to continue the ACC without performing the PCBC" or "to perform the PCBC and stop the ACC" when it has been determined that the performing condition for the PCBC (either the PBC or the LPBC) is satisfied during the performance of the ACC. Therefore, the ECU 10 determines whether or not the PCBC flag is 1 every time the predetermined calculation interval elapses during the engine on period, and performs the ACC determination when having determined that the PCBC flag=1 is satisfied.

A specific description will be made below. In general, when the vehicle 100 faces the avoidance operation necessary situation in a case where the deceleration control by the ACC is being performed (that is, the AORC is not being performed), a deceleration amount based on the ACC (the deceleration control) in addition to a deceleration amount based on the PCBC can be ensured. On the other hand, when the vehicle 100 faces the avoidance operation necessary situation in a case where the AORC is being performed, a deceleration amount based on the ACC cannot be ensured since the vehicle 100 is under the acceleration control. In this case, it is likely that a deceleration amount based on the PCBC alone is insufficient even in the situation with the low collision risk, and therefore it is desirable to have the driver perform the brake operation in accompany with the performance of the PCBC. Thus, the ECU 10 performs the PCBC and stops the ACC regardless of a degree of the collision risk (that is, regardless of the PCBC being the PBC or the LPBC) when the AORC is being performed (that is, when the AOR flag=1). Thereby, it becomes possible to surely prompt the driver to intervene in the brake control.

In contrast, when the collision risk is relatively high (that is, when the PBC flag=1 and the LPBC flag=0) in a case where the AORC is not being performed (that is, in a case where the AOR flag=0. In other words, in a case where the trailing by the ACC is being performed), the ECU 10 performs the PBC and stops the ACC. This is performed regardless of the ACC, which is being performed at a point in time when the performing condition for the PBC has been determined to be satisfied, is the acceleration control or the deceleration control (that is, regardless of the AC deceleration control flag being 1 or 0). With this configuration also, it becomes possible to surely prompt the driver to intervene in the brake control.

On the one hand, when the collision risk is relatively low and "the deceleration control by the ACC is being performed at a point in time when the performing condition for the LPBC has been determined to be satisfied (that is, the LPBC flag=1 and the AC deceleration control flag=1)" in a case where the AORC is not being performed (that is, in a case where the AOR flag=0. In other words, in a case where the trailing by the ACC is being performed), the ECU 10 continues the ACC without performing the LPBC. Thereby, a possibility of giving a strange and annoying feeling to the driver stemmed from the LPBC being performed and the ACC being stopped contrary to the driver's expectation can be reduced.

On the other hand, when the collision risk is relatively low but "the acceleration control by the ACC is being performed at a point in time when the performing condition for the LPBC has been determined to be satisfied (that is, the LPBC flag=1 and the AC deceleration control flag=0)" in a case where the AORC is not being performed (that is, in a case where the AOR flag=0. In other words, in a case where the trailing by the ACC is being performed), a deceleration amount based on the ACC cannot be ensured, and thereby it is likely that a deceleration amount based on the LPBC alone is insufficient even in the situation with the low collision risk. Therefore, in such a case as mentioned above, the ECU 10 performs the LPBC and stops the ACC. Accordingly, it becomes possible to surely prompt the driver to intervene in the brake control.

<Control Flow of the First Embodiment Apparatus>

Next, a description about a control flow of the first embodiment apparatus will be made. The CPU of the vehicle control ECU 10 of the first embodiment apparatus is configured to perform routines shown by flowcharts in FIG. 5 through FIG. 9 every time the predetermined calculation interval elapses during the engine on period.

Figure 5:
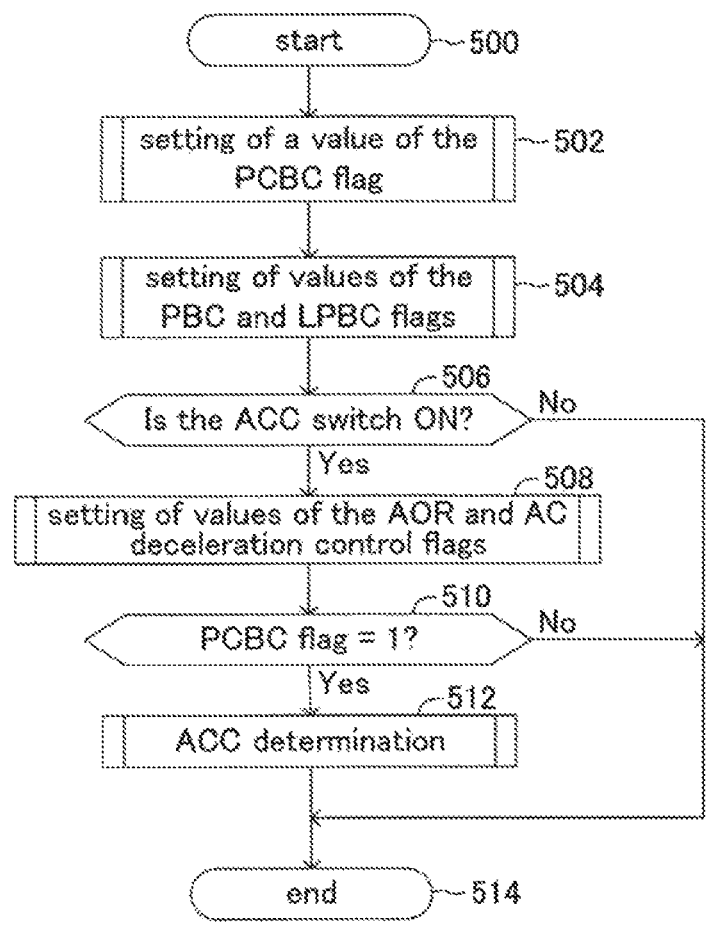
FIG. 5 is a flowchart showing a routine performed by CPU (hereinafter, referred to as "CPU of the first embodiment apparatus") of a vehicle control ECU of the first embodiment apparatus.

When a predetermined timing arrives, the CPU starts processing with a step 500 in FIG. 5 and performs processing of a following step 502.

Step 502: The CPU performs processing of setting a value of the PCBC flag. In the routine in FIG. 5, the CPU performs the routine shown by the flowchart in FIG. 6 at the step 502. That is, the CPU proceeds to the step 502, and subsequently starts processing with a step 600 in FIG. 6 to perform processing of a following step 602.

Step 602: The CPU acquires the own vehicle information of the vehicle 100 (the vehicle speed, the accelerator pedal operation amount, the brake pedal operation amount, the yaw rate, the state of the ACC switch 17 and the state of the vehicle speed•inter-vehicular distance setting switch 18) as mentioned above, and stores this information in the RAM of the ECU 10.

Subsequently, the CPU proceeds to a step 604 to determine whether or not there exist more than or equal to one target objects. When having determined that there exist such target objects, the CPU makes an "Yes" determination at the step 604 and performs processing of following step 606 to step 610 in this order.

Step 606: The CPU acquires the target object information of each of the target objects (the distance, the azimuth, and the relative speed) as mentioned above, and stores this information in the RAM of the ECU 10.

Step 608: The CPU calculates, for each of the target objects having the target object information acquired at the step 606, a time-to-collision (TTC) to the target object by dividing the distance to the target object by the relative speed, and stores the value in the RAM of the ECU 10.

Step 610: The CPU selects a target object with a minimum TTC of the TTCs calculated at the step 608 (hereinafter, this target object is also referred to as a "selected target object"), and labels the target object information of this selected target object, which is one of the target object informations stored in the RAM of the ECU 10 at the step 606, as "selected target object information".

Subsequently, the CPU proceeds to a step 612 to determine whether or not the selected target object selected at the step 610 is a pedestrian or a bicycle based on the selected target object information. When having determined that the selected target object is neither a pedestrian nor a bicycle (that is, when having determined that the selected target object is an other vehicle), the CPU makes a "No" determination at the step 612 and performs processing of a following step 613.

Step 613: The CPU calculates a lap rate LR with the selected target object determined to be an other vehicle at the step 612, and stores the value in the RAM of the ECU 10.

Next, the CPU proceeds to a step 614 to determine whether or not the lap rate LR calculated at the step 613 is more than or equal to the first lap rate threshold LRth1. When having determined that LR≥LRth1 is satisfied, the CPU makes an "Yes" determination at the step 614 (that is, determines that the lap rate LR corresponds to at least the low lap), and proceeds to a following step 616.

At the step 616, the CPU determines whether or not the TTC to the selected target object (an other vehicle) is less than the first time threshold TTCth1. When having determined that TTC<TTCth1 is satisfied, the CPU makes an "Yes" determination at the step 616 (that is, determines that the performing condition for the PCBC is satisfied), and proceeds to a step 620 described later.

On the other hand, when having determined that the selected target object is a pedestrian or a bicycle at the step 612, the CPU makes an "Yes" determination at the step 612, and proceeds to a following step 618.

At the step 618, the CPU determines whether or not the TTC to the selected target object (a pedestrian or a bicycle) is less than the second time threshold TTCth2. When having determined that TTC<TTCth2 is satisfied, the CPU makes an "Yes" determination at the step 618 (that is, determines that the performing condition for the PCBC is satisfied), and proceeds to the following step 620.

Step 620: The CPU sets the value of the PCBC flag to 1 to store the value in the RAM of the ECU 10. Thereafter, the CPU proceeds to a step 504 in FIG. 5 via a step 624.

In contrast, when having determined that there do not exist any target objects at the step 604, the CPU makes a "No" determination at the step 604 (that is, determines that there does not exist a target of the PCBC (a target of the PBC and the LPBC)). In addition, when having determined that LR≥LRth1 is not satisfied at the step 614, the CPU makes a "No" determination at the step 614 (that is, determines that the lap rate does not correspond to either the high lap or the low lap). Further, when having determined that TTC<TTCth1 is not satisfied at the step 616, the CPU makes a "No" determination at the step 616 (that is, determines that the performing condition for the PCBC is not satisfied). Similarly, when having determined that TTC<TTCth2 is not satisfied at the step 618, the CPU makes a "No" determination at the step 618 (that is, determines that the performing condition for the PCBC is not satisfied). In such cases as mentioned above, the CPU proceeds to a following step 622.

Step 622: The CPU sets all values of the PCBC flag, the PBC flag, and the LPBC flag to 0, and stores these values in the RAM of the ECU 10. Thereafter, the CPU proceeds to the step 504 in FIG. 5 via the step 624.

When the CPU proceeds to the step 504 in FIG. 5, the CPU performs processing of setting values of the PBC flag and the LPBC flag. In the routine in FIG. 5, the CPU performs the routine shown by the flowchart in FIG. 7 at the step 504. That is, the CPU proceeds to the step 504 and subsequently starts processing with a step 700 in FIG. 7 to perform processing of a following step 702.

Step 702: The CPU determines whether or not the value of the PCBC flag is 1. When having determined that the PCBC flag=1 is satisfied, the CPU makes an "Yes" determination at the step 702 (that is, determines that the performing condition for either one of the PBC or the LPBC is satisfied), and proceeds to a following step 704.

Figure 6:
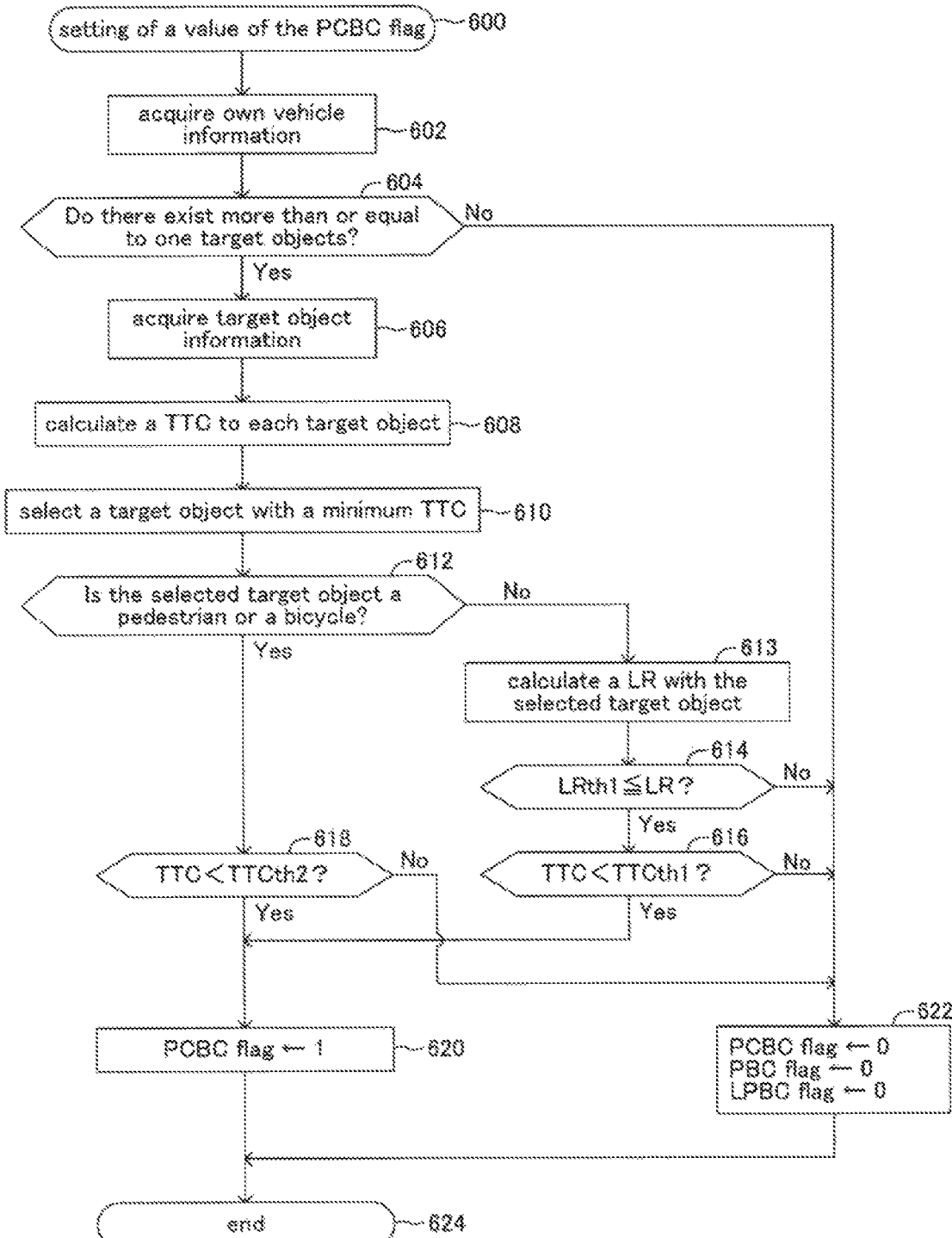
FIG. 6 is a flowchart showing a routine performed by the CPU of the first embodiment apparatus.
Figure 7:
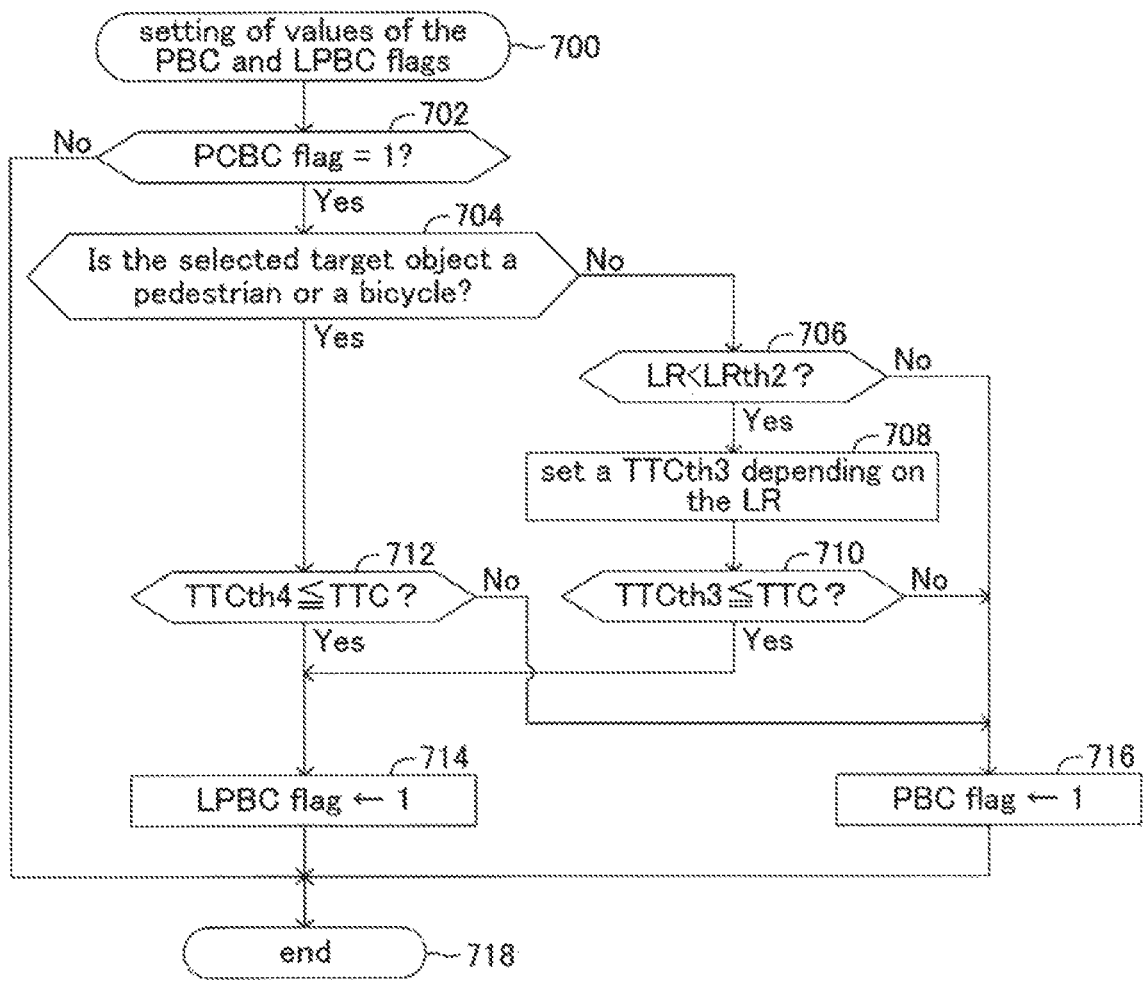
FIG. 7 is a flowchart showing a routine performed by the CPU of the first embodiment apparatus.
Figure 8:
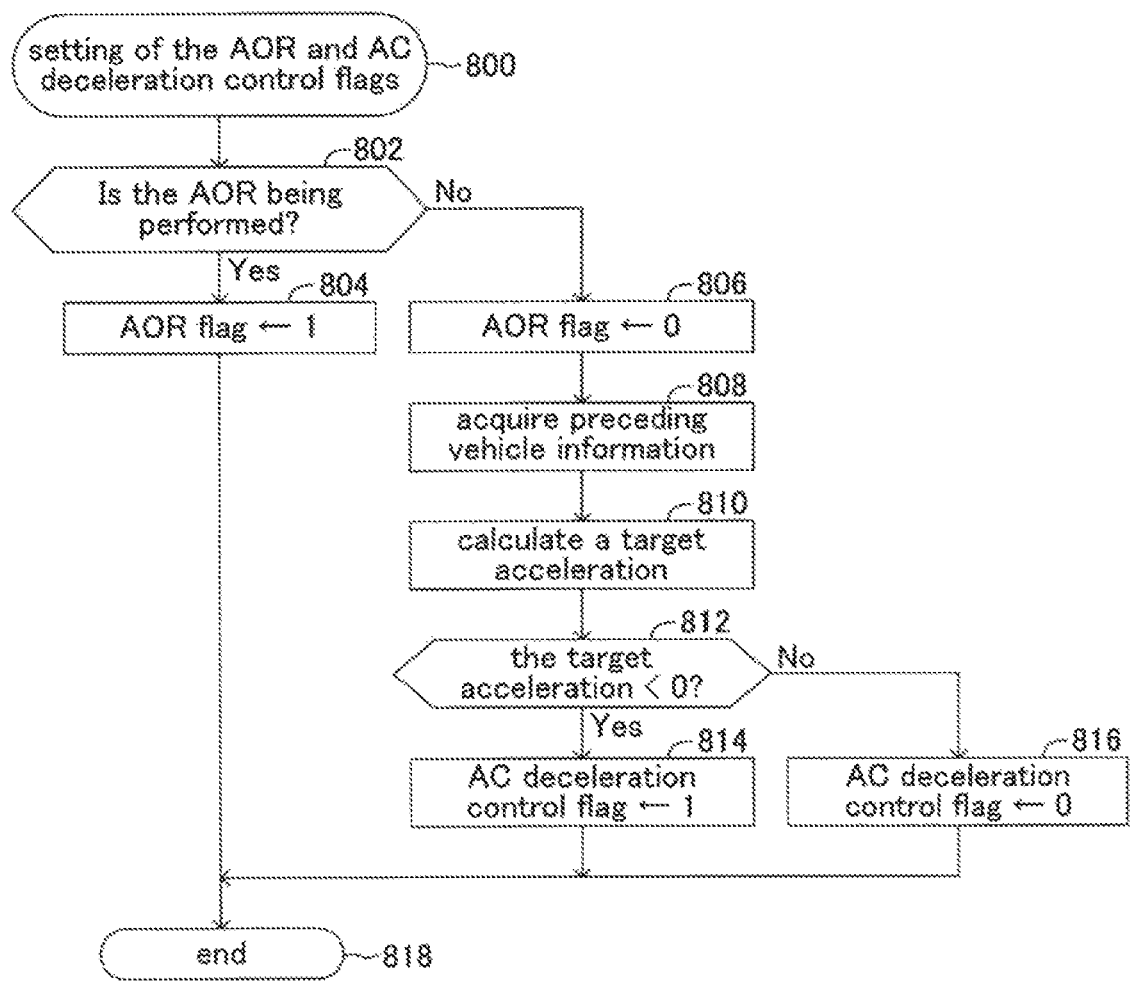
FIG. 8 is a flowchart showing a routine performed by the CPU of the first embodiment apparatus.
Figure 9:
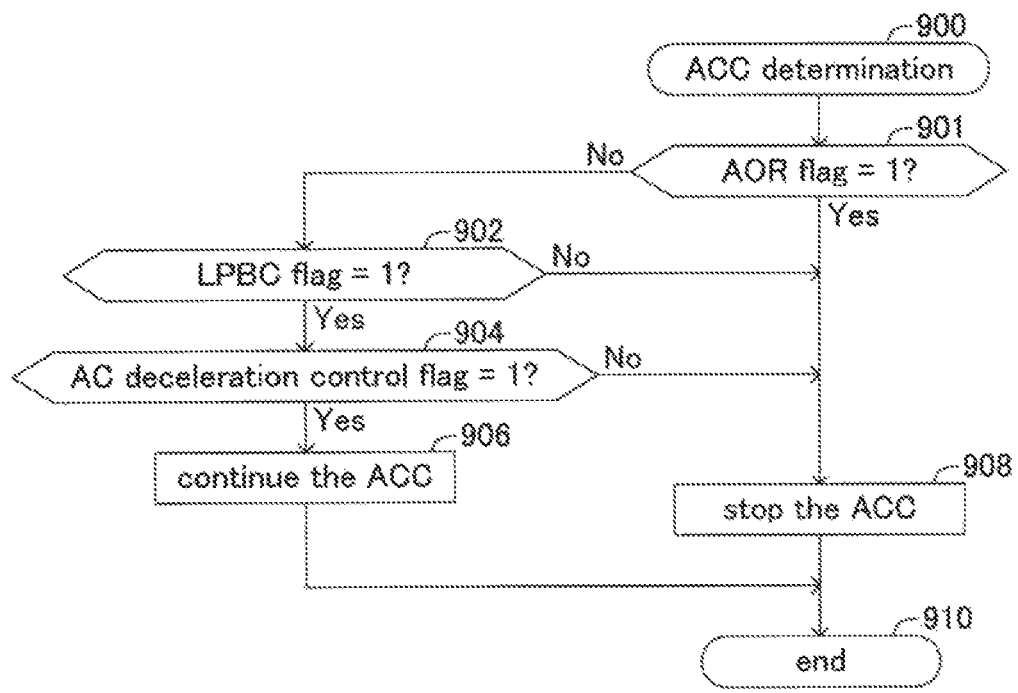
FIG. 9 is a flowchart showing a routine performed by the CPU of the first embodiment apparatus.

At the step 704, the CPU performs the same processing as the processing at the step 612 in FIG. 6 for the selected target object selected at the step 610 in FIG. 6. When having determined that the selected target object is neither a pedestrian nor a bicycle (that is, when having determined that the selected target object is an other vehicle), the CPU makes a "No" determination at the step 704, and proceeds to a following step 706.

At the step 706, the CPU determines whether or not the lap rate LR calculated at the step 613 in FIG. 6 is less than the second lap rate threshold LRth2. When having determined that LR<LRth2 is satisfied, the CPU makes an "Yes" determination at the step 706 (that is, determines that the lap rate LR corresponds to the low lap), and performs processing of a following step 708.

Step 708: The CPU identifies a steering avoidance limit time $T_S$ corresponding to the lap rate LR calculated at the step 613 in FIG. 6 by referring to the graph shown in FIG. 3 stored in the memory (ROM). The CPU sets the steering avoidance limit time $T_S$ identified as the third time threshold TTCth3, and stores in the RAM of the ECU 10.

Next, the CPU proceeds to a step 710 to determine whether or not the TTC to the selected target object (an other vehicle) is more than or equal to the third time threshold TTCth3 set at the step 708. When having determined that TTC TTCth3 is satisfied, the CPU makes an "Yes" determination at the step 710 (that is, determines that the performing condition for the LPBC is satisfied), and proceeds to a step 714 described later.

On the one hand, when having determined that the selected target object is a pedestrian or a bicycle at the step 704, the CPU makes an "Yes" determination at the step 704, and proceeds to a following step 712.

At the step 712, the CPU determines whether or not the TTC to the selected target object (a pedestrian or a bicycle) is more than or equal to the fourth time threshold TTCth4. When having determined that TTC TTCth4 is satisfied, the CPU makes an "Yes" determination at the step 712 (that is, determines that the performing condition for the LPBC is satisfied), and proceeds to the following step 714.

Step 714: The CPU sets the value of the LPBC flag to 1 to store the value in the RAM of the ECU 10. Thereafter, the CPU proceeds to a step 506 in FIG. 5 via a step 718.

On the other hand, when having determined that LR<LRth2 is not satisfied at the step 706, the CPU makes a "No" determination at the step 706 (that is, determines that the lap rate LR corresponds to the high lap). In addition, when having determined that TTC TTCth3 is not satisfied at the step 710, the CPU makes a "No" determination at the step 710 since the selected target object is a vehicle, the lap rate LR corresponds to the low lap, and TTC<TTCth3 is satisfied (that is, determines that the performing condition for the PBC is satisfied). Further, when having determined that TTC≥TTCth4 is not satisfied at the step 712, the CPU makes a "No" determination at the step 712 since the selected target object is a pedestrian or a bicycle and TTC<TTCth4 is satisfied (that is, determines that the performing condition for the PBC is satisfied). In such cases as mentioned above, the CPU performs processing of a following step 716.

Step 716: The CPU sets the value of the PBC flag to 1, and stores the value in the RAM of the ECU 10. Thereafter, the CPU proceeds to the step 506 in FIG. 5 via the step 718.

In contrast, when having determined that the PCBC flag=1 is not satisfied (that is, the PCBC flag=0 is satisfied) at the step 702, the CPU makes a "No" determination at the step 702 to proceeds to the step 506 in FIG. 5 via the step 718. In this case, the values of the PBC flag and the LPBC flag have been both set to 0 (refer to the step 622 in FIG. 6).

When the CPU proceeds to the step 506 in FIG. 5, the CPU determines whether or not the ACC switch 17 is in the one state based on the own vehicle information acquired at the step 602 in FIG. 6. When having determined that the ACC switch 17 is in the one state, the CPU makes an "Yes" determination at the step 506 (that is, determines that the ACC is being performed), and perform processing of a following step 508.

Step 508: The CPU performs processing of setting values of the AOR flag and the AC deceleration control flag. In the routine in FIG. 5, the CPU performs the routine shown by the flowchart in FIG. 8 at the step 508. That is, the CPU proceeds to the step 508, and subsequently starts processing with a step 800 in FIG. 8 to proceed to a following step 802.

At the step 802, the CPU determines whether or not the AORC is being performed as mentioned above. When having determined that the AORC is being performed, the CPU makes an "Yes" determination at the step 802, and performs processing of a following step 804.

Step 804: The CPU sets the value of the AOR flag to 1 and stores the value in the RAM of the ECU 10. Thereafter, the CPU proceeds to a step 510 in FIG. 5 via a step 818. That is, the AORC is performed in preference to the trailing by the ACC, and therefore when having determined that the AORC is being performed, the CPU does not perform processing of setting the value of the AC deceleration control flag (instead, uses the value at the previous calculation interval).

On the other hand, when having determined that the AORC is not being performed at the step 802, the CPU makes a "No" determination at the step 802, and performs processing of a following step 806.

Step 806: The CPU sets the value of the AOR flag to 0 to store the value in the RAM of the ECU 10. Thereafter, the CPU performs following processing of a step 808 and a step 810 in this order.

Step 808: The CPU acquires the preceding vehicle information (the distance and the relative speed) as mentioned above, and stores this information in the RAM of the ECU 10.

Step 810: The CPU calculates a target acceleration for trailing the preceding vehicle at a vehicle speed less than or equal to the set vehicle speed, maintaining the set inter-vehicular distance, and stores the calculated value in the RAM of the ECU 10.

Subsequently, the CPU proceeds to a step 812 to determine whether or not the target acceleration calculated at the step 810 is less than 0 (that is, a negative value). When having determined that the target acceleration<0 is satisfied, the CPU makes an "Yes" determination at the step 812 (that is, determines that the deceleration control by the ACC is being performed), and performs processing of a following step 814.

Step 814: The CPU sets the value of the AC deceleration control flag to 1, and stores the value in the RAM of the ECU 10. Thereafter, the CPU proceeds to a step 510 in FIG. 5 via the step 818.

In contrast, when having determined that the target acceleration<0 is not satisfied (that is, the target acceleration≥0 is satisfied) at the step 812, the CPU makes a "No" determination at the step 812 (that is, determines that the acceleration control by the ACC is being performed), and performs processing of a following step 816.

Step 816: The CPU sets the value of the AC deceleration control flag to 0, and stores the value in the RAM of the ECU 10. Thereafter, the CPU proceeds to the step 510 in FIG. 5 via the step 818.

When the CPU proceeds to the step 510 in FIG. 5, the CPU determines whether or not the value of the PCBC flag set at the step 502 is 0. When having determined that the PCBC flag=1 is satisfied, the CPU makes an "Yes" determination at the step 510 (that is, determines that the performing condition for the PCBC is satisfied), and performs processing of a following step 512.

Step 512: When the value of the PCBC flag is set to 1 during the performance of the ACC, the CPU performs an ACC determination processing for determining whether "to continue the ACC without performing the PCBC" or "to perform the PCBC and stop the ACC". In the routine in FIG. 5, the CPU performs the routine shown by the flowchart in FIG. 9 at the step 512. That is, the CPU proceeds to the step 512, and subsequently starts processing with a step 900 in FIG. 9 to proceed to a following step 901.

At the step 901, the CPU determines whether or not the value of the AOR flag set at the step 508 in FIG. 5 is 1. When having determined that the AOR flag=1 is not satisfied, the CPU makes a "No" determination at the step 901 (that is, determines that the AORC is not being performed but the trailing by the ACC is being performed), and proceeds to a following step 902.

At the step 902, the CPU determines whether or not the value of the LPBC flag set at the step 504 in FIG. 5 is 1. When having determined that the LPBC flag=1 is satisfied, the CPU makes an "Yes" determination at the step 902 (that is, determines that the performing condition for the LPBC is satisfied during the performance of the ACC), and proceeds to a following step 904.

At the step 904, the CPU determines whether or not the value of the AC deceleration control flag set at the step 508 in FIG. 5 is 1. When having determined that the AC deceleration control flag=1 is satisfied, the CPU makes an "Yes" determination at the step 904 (that is, determines that the deceleration control by the ACC is being performed at a point in time when the performing condition for the LPBC has been determined to be satisfied), and performs processing of a following step 906.

Step 906: The CPU does not perform the LPBC but continues the ACC. Thereafter, the CPU proceeds to a step 514 in FIG. 5 via a step 910 to tentatively terminate the present routine.

In contrast, when having determined that the AOR flag=1 is satisfied at the step 901, the CPU makes an "Yes" determination at the step 901 (that is, determines that the AORC is being performed at a point in time when the performing condition for the PCBC has been determined to be satisfied). In addition, when having determined that the LPBC flag=1 is not satisfied (that is, the LPBC flag=0 and the PBC flag=1 are both satisfied) at the step 902, the CPU makes a "No" determination at the step 902 (that is, determines that the PBC is started during the performance of the trailing by the ACC). Further, when having determined that the AC deceleration control flag=1 is not satisfied at the step 904, the CPU makes a "No" determination at the step 904 (that is, determines that the acceleration control by the ACC is being performed at a point in time when the performing condition for the LPBC has been determined to be satisfied). In such cases as mentioned above, the CPU performs processing of a following step 908.

Step 908: The CPU stops the ACC. Specifically, when an "Yes" determination has been made at the step 901, the CPU performs the PBC and stops the ACC when the PBC flag=1 is satisfied, while performs the LPBC and stops the ACC when the LPBC flag=1 is satisfied. When a "No" determination has been made at the step 902, the CPU performs the PBC and stops the ACC. When a "No" determination has been made at the step 904, the CPU performs the LPBC and stops the ACC. Thereafter, the CPU proceeds to the step 514 in FIG. 5 via the step 910 to tentatively terminate the present routine.

On the other hand, when having determined that the ACC switch 17 is in the off state at the step 506 in FIG. 5, the CPU makes a "No" determination at the step 506 (that is, determines that the ACC is not being performed), and proceeds to the step 514 to tentatively terminate the present routine. In addition, when having determined that the PCBC flag=1 is not satisfied at the step 510, the CPU makes a "No" determination at the step 510 (that is, determines that although the ACC is being performed, the performing condition for the PCBC is not satisfied), and proceeds to the step 514 to tentatively terminate the present routine.

Effects of the first embodiment apparatus will be described. In the first embodiment apparatus, the PCBC is not performed but the ACC continues to be performed when following conditions a and b are satisfied in a case of a control object being a preceding vehicle, or when a following condition c is satisfied in a case of a control object being a pedestrian or a bicycle, in a case where the deceleration control by the ACC is being performed at a point in time when the performing condition for the PCBC has been determined to be satisfied during the performance of the ACC, this performing condition being TTC<TTCth1 in a case of a control object being a preceding vehicle and TTC<TTCth2 in a case of a control object being a pedestrian or a bicycle.

In a case of an object subject to the PCBC being a preceding vehicle $$LRth1 \leq LR < LRth2 \quad \text{(Condition a)}$$

$$TTCth3 \leq TTC \quad \text{(Condition b)}$$

In a case of an object subject to the PCBC being a pedestrian or a bicycle $$TTCth4 \leq TTC \quad \text{(Condition c)}$$

A case where the conditions a and b are satisfied or the condition c is satisfied in a case when the deceleration control by the ACC is being performed at a point in time when the performing condition for the PCBC has been determined to be satisfied is highly likely to be a case where TTC<TTCth1 (in a case of a control object being a preceding vehicle) or TTC<TTCth2 (in a case of a control object being a pedestrian or a bicycle) is satisfied in the "situation where the driver does not consider oneself to be in the avoidance operation necessary situation" or in the "situation where the driver recognizes (considers) oneself to be in the avoidance operation necessary situation, however, the driver has an intension to avoid a collision by the steering wheel operation instead of the brake operation". That is, the case above is highly likely to be a case where the driver does not assume the PCBC to be performed and rather expects the performance of the ACC to be continued. According to the first embodiment apparatus, the PCBC is not performed but the performance of the ACC is continued in such a case. Therefore, an occurrence of a situation where the PCBC is performed and the ACC is stopped contrary to the driver's expectation can be suppressed, and a possibility of giving a strange and annoying feeling to the driver can be reduced.

In addition, in the first embodiment apparatus, the PCBC is not performed but the ACC continues to be performed also when the above conditions a and b are satisfied in a case of a control object being a preceding vehicle, or when the above condition c is satisfied in a case of a control object being a pedestrian or a bicycle, in a case where the AORC is being performed at a point in time when the performing condition for the PCBC has been determined to be satisfied.

A case where the conditions a and b are satisfied or the condition c is satisfied in a case when the AORC is being performed at a point in time when the performing condition for the PCBC has been determined to be satisfied is highly likely to be a case where TTC<TTCth1 (in a case of a control object being a preceding vehicle) or TTC<TTCth2 (in a case of a control object being a pedestrian or a bicycle) is satisfied in the "situation where the driver does not consider oneself to be in the avoidance operation necessary situation". That is, the case above is highly likely to be a case where the driver does not assume the PCBC to be performed and rather expects the performance of the ACC to be continued. According to the first embodiment apparatus, in such a case also, the PCBC is not performed but the performance of the ACC is continued. Therefore, a possibility of giving a strange and annoying feeling to the driver can be more reduced.

Further, in the first embodiment apparatus, the PCBC consists of two steps, the PBC and the LPBC. In a case where an object subject to the PCBC is a preceding vehicle and the performing condition for the PCBC is satisfied, the braking force by the LPBC is applied when the above conditions a and b are satisfied (however, the LPBC is not performed when the deceleration control by the ACC is being performed at a point in time when the performing condition for the PCBC has been determined to be satisfied), and the braking force by the PBC is applied when at least one of the conditions a and b is not satisfied. Besides, in a case where an object subject to the PCBC is a pedestrian or a bicycle and the performing condition for the PCBC is satisfied, the braking force by the LPBC is applied when the above condition c is satisfied (however, the LPBC is not performed when the deceleration control by the ACC is being performed at a point in time when the performing condition for the PCBC has been determined to be satisfied), and the braking force by the PBC is applied when the condition c is not satisfied.

According to the above configuration, when it is highly likely that the driver does not assume the PCBC to be performed, the light braking force by the LPBC is applied or the LPBC itself is not performed. Therefore, a degree to interfere with the driving operation by the driver can be reduced. In addition, in a case where it turned out that the driver was actually in the avoidance operation necessary situation, when the LPBC is performed, a certain amount of deceleration amount can be ensured compared with a configuration where no braking force is applied since the light braking force is applied to the vehicle 100, and when the LPBC is not performed, on the other hand, a deceleration amount based on the deceleration control by the ACC can be ensured. Thus, in both cases, a collision avoidance or reduction of a collision damage can be properly realized.

Further, the first embodiment apparatus is configured to change the third time threshold TTCth3 in such a manner that the third time threshold TTCth3 becomes smaller as the lap rate LR becomes low. According to this configuration, even though the TTC to the preceding vehicle becomes shorter (that is, even though the vehicle 100 approaches the preceding vehicle closer), as the lap rate LR becomes lower, the PCBC becomes more difficult to be performed and the ACC becomes easier to be continued. It is highly likely that as the lap rate LR becomes lower, a distance to the preceding vehicle becomes shorter for a purpose of the vehicle 100 passing the preceding vehicle or the driver of the vehicle 100 avoiding a collision with the preceding vehicle by the steering wheel operation. Therefore, according to the configuration above, a possibility that the PCBC is performed and the ACC is stopped contrary to the driver's expectation can be further reduced.

Second Embodiment

Figure 10:
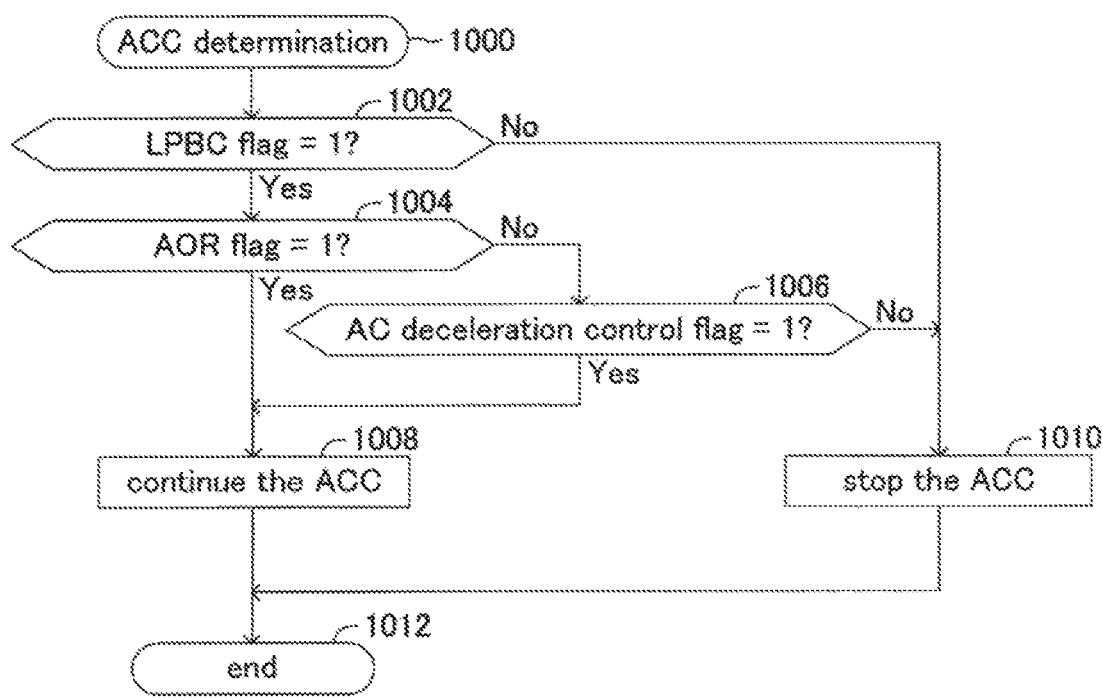
FIG. 10 is a flowchart showing a routine performed by CPU of a second embodiment apparatus.

Next, a vehicle control apparatus (a second embodiment apparatus) according to a second embodiment of the present disclosure will be described below. In the second embodiment apparatus, only an ACC determination processing at a step 512 in FIG. 5 differs from that in the first embodiment apparatus. Specifically, in the first embodiment apparatus, when it is determined that the AORC is being performed at a point in time the performing condition for the PCBC has been determined to be satisfied, the PCBC is performed and the ACC is stopped regardless of the types of the PCBC (refer to an "Yes" at the step 901 in FIG. 9). In contrast, in the second embodiment apparatus, when a type of the PCBC is the LPBC in a case where it is determined that the AORC is being performed at a point in time the performing condition for the PCBC has been determined to be satisfied, this LPBC is not performed but the ACC is continued (refer to an "Yes" at a step 1004 in FIG. 10 which will be described later). In the following, an ACC determination processing (refer to the step 512 in FIG. 5) of the second embodiment apparatus will be described.

Step 512: The CPU performs the ACC determination processing. In a routine of the second embodiment apparatus in FIG. 5, the CPU proceeds to the step 512, and subsequently starts processing with a step 1000 in FIG. 10 to proceed to a following step 1002.

At the step 1002, the CPU determines whether or not the value of the LPBC flag set at the step 504 in FIG. 5 is 1. When having determined that the LPBC flag=1 is satisfied, the CPU makes an "Yes" determination at the step 1002 (that is, determines that the performing condition for the LPBC is satisfied during the performance of the ACC), and proceeds to the following step 1004.

At the step 1004, the CPU determines whether or not the value of the AOR flag set at the step 508 in FIG. 5 is 1. When having determined that the AOR flag=1 is satisfied, the CPU makes an "Yes" determination at the step 1004 (that is, determines that the AORC is being performed at a point in time when the performing condition for the LPBC has been determined to be satisfied), and performs processing of a step 1008 which will be described later.

On the other hand, when having determined that the AOR flag=1 is not satisfied (that is, the AOR flag=0 is satisfied) at the step 1004, the CPU makes a "No" determination at the step 1004 (that is, determines that the trailing by the ACC is being performed in place of the AORC at a point in time when the performing condition for the LPBC has been determined to be satisfied), and proceeds to a following step 1006.

At the step 1006, the CPU determines whether or not the value of the AC deceleration control flag set at the step 508 in FIG. 5 is 1. When having determined that the AC deceleration control flag=1 is satisfied, the CPU makes an "Yes" determination at the step 1006 (that is, determines that the deceleration control by the ACC is being performed at a point in time when the performing condition for the LPBC has been determined to be satisfied), and performs processing of a following step 1008.

Step 1008: The CPU determines not to perform the LPBC but to continue the ACC. Thereafter, the CPU proceeds to the step 514 in FIG. 5 via a step 1012 to tentatively terminate the present routine.

In contrast, when having determined that the LPBC flag=1 is not satisfied (that is, the LPBC flag=0 and the PBC flag=1 are both satisfied) at the step 1002, the CPU makes a "No" determination at the step 1002 (that is, determines that the PBC is performed during the performance of the ACC). In addition, when having determined that the AC deceleration control flag=1 is not satisfied at the step 1006, the CPU makes a "No" determination at the step 1006 (that is, determines that the acceleration control by the ACC is being performed at a point in time when the performing condition for the LPBC has been determined to be satisfied). In such cases as mentioned above, the CPU performs processing of a following step 1010.

Step 1010: The CPU determines to perform the PCBC (the PBC or the LPBC) and to stop the ACC. Thereafter, the CPU proceeds to the step 514 in FIG. 5 via the step 1012 to tentatively terminate the present routine.

With this configuration also, the similar effects to the first embodiment apparatus can be obtained.

In the first embodiment apparatus, when it is determined that the AORC is being performed at a point in time when the performing condition for the PCBC has been determined to be satisfied, the PCBC is performed and the ACC is stopped. The reason why such a configuration is adopted is because the AORC is an acceleration control and therefore a deceleration amount based on the ACC cannot be ensured, resulting in that a deceleration amount may not be able to be sufficiently ensured even in the situation with the low collision risk.

However, from a different perspective, it can be also considered that the AORC is an acceleration control based on a driver's intention and therefore it is highly likely that the driver intervenes in the brake control on his/her own initiative when facing the avoidance operation necessary situation, resulting in that a sufficient deceleration amount can be ensured. Hence, in the second embodiment apparatus, when a type of the PCBC is the LPBC in a case where it is determined that the AORC is being performed at a point in time when the performing condition for the PCBC has been determined to be satisfied, the LPBC is not performed but the ACC is continued.

According to the configuration above, when facing the avoidance operation necessary situation with a relatively low collision risk, a deceleration amount based on the brake operation by the driver can be ensured due to the independent intervention in the brake control by the driver even though the LPBC is not performed. Therefore, it becomes unnecessary to stop the ACC for a purpose of prompting the driver to intervene in the brake control. Thus, according to the configuration of the second embodiment apparatus, a deceleration amount can be sufficiently ensured in the avoidance operation necessary situation with the relatively low collision risk, and a possibility of giving a strange and annoying feeling to the driver stemmed from the LPBC being performed and the ACC being stopped contrary to the driver's expectation can be further reduced.

Third Embodiment

Subsequently, a vehicle control apparatus (a third embodiment apparatus) according to a third embodiment of the present disclosure will be described below. In the third embodiment apparatus, only an ACC determination processing at a step 512 in FIG. 5 differs from that in the first embodiment apparatus. Specifically, the third embodiment apparatus differs from the first embodiment apparatus in that either one of the PBC or the LPBC never fails to be performed when the performing condition for the PCBC is satisfied during the performance of the ACC, that the performance of the ACC is stopped when the PCBC is started during the performance of the ACC, and that the ACC is automatically resumed after the performance of the LPBC when the deceleration control by the ACC is being performed at a point in time when the performing condition for the LPBC has been determined to be satisfied. Hereinafter, differences from the first embodiment apparatus will be mainly described.

<Summary of Operation of Third Embodiment Apparatus>

The third embodiment apparatus stops the performance of the ACC when the PCBC is started during the performance of the ACC at the trailing mode. Besides, the third embodiment apparatus determines whether or not to automatically resume the ACC when the performance of the PCBC is finished (ACC determination). If the ACC is resumed automatically after the performance of the PCBC, there is a possibility that the driver overestimates a performance of the third embodiment apparatus and does not intervene in the brake control after the performance of the PCBC. Therefore, in the situation where the collision risk is expected to be relatively high, it is desired to prompt the driver to surely intervene in the brake control by continuing to stop the ACC after the performance of the PCBC. Thus, when a type of the PCBC is the PBC (that is, a control performed when the collision risk is relatively high), the third embodiment apparatus determines that the PBC alone is insufficient, and continues to stop the ACC after the performance of the PBC.

On the other hand, in a configuration where the ACC always continues to be stopped after the performance of the PCBC, if the performing condition for the PCBC happens to be satisfied contrary to the driver's intension, the ACC will not be automatically resumed contrary to the driver's expectation, which is not desirable.

As described above by referring to FIG. 4A to FIG. 4C, the collision risk is expected to be relatively low in a "case where the PCBC happens to be performed contrary to the driver's intension". Therefore, when a type of this PCBC is the LPBC (that is, a control performed when the collision risk is relatively low), if the deceleration control by the ACC is being performed at a point in time when the performing condition for this LPBC has been determined to be satisfied, the third embodiment apparatus automatically resumes the ACC when this LPBC is finished. Besides, if the deceleration control by the ACC is not being performed at a point in time when the performing condition for this LPBC has been determined to be satisfied (that is, if the acceleration control by the ACC or the acceleration override control is being performed at this point in time), the third embodiment apparatus continues to stop the ACC also after this LPBC is finished. That is, assuming that the performing condition for the LPBC has been determined to be satisfied in the examples of FIG. 4A through FIG. 4C, the deceleration control by the ACC is being performed at a point in time when the performing condition for the LPBC has been determined to be satisfied, and therefore the ACC will be resumed automatically when the LPBC is finished. Thus, it can be prevented that the ACC continues to be stopped after the performance of the LPBC contrary to the driver's expectation.

Based on the summary mentioned above, hereinafter, points different from the first embodiment apparatus concerning the PCBC and the ACC determination processing will be mainly described in detail.

<Detail of Operation of the Third Embodiment Apparatus>
D. PCB Control
[LPBC in a Case when the Target Object is an Other Vehicle]

In a case of the low lap, when the TTC is more than or equal to the third time threshold TTCth3 and less than the first time threshold TTCth1, the collision risk is relatively low since the steering avoidance is possible although there is still some collision possibility because the brake avoidance is difficult. If a braking force equal to the braking force of the PBC is applied in such a case, the interference with the driving operation by the driver occurs in a case where the driver has an intention to avoid a collision by the steering wheel operation, resulting in giving a strange or annoying feeling to the driver. In addition, when the vehicle 100 changes a traffic lane for a purpose of passing the other vehicle, the vehicle 100 may deviate in the vehicle width direction with respect to the other vehicle, temporarily approaching the other vehicle, and as a result, the lap rate LR may become low (that is, the low lap), and the TTC may become more than or equal to the third time threshold TTCth3 and less than the first time threshold TTCth1. In this case also, if a braking force equal to the braking force of the PBC is applied, this control may be regarded as an unnecessary control, causing a strange or annoying feeling to the driver since the driver does not consider oneself to be in the situation where a collision avoidance with the other vehicle is necessary. However, if any braking force is not applied in order to resolve this, a deceleration amount cannot be sufficiently ensured when it turned out that the PCBC was actually necessary.

Therefore, when the TTC is more than or equal to the third time threshold TTCth3 and less than the first time threshold TTCth1 in a case of the low lap, the ECU 10 determines that the performing condition for the LPBC for applying a light braking force is satisfied, and performs the LPBC. That is, the ECU 10 performs two stages of the PCBC in case of the low lap. In some embodiments, the braking force of the LPBC is set to such a value (magnitude) that the driver can accept the performance of the LPBC even in a "case where the driver of the vehicle 100 does not assume the PCBC to be performed".

[PBC and LPBC in a Case when the Target Object is a Pedestrian or a Bicycle]

When the TTC is less than the fourth time threshold TTCth4, the ECU 10 determines that the performing condition for the PBC is satisfied to perform the PBC, and when the TTC is more than or equal to the fourth time threshold TTCth4 and less than the second time threshold TTCth2, the ECU 10 determines that the performing condition for the LPBC is satisfied to perform the LPBC. By adopting a configuration where the LPBC is switched to the PBC in accompany with a decrease in the TTC, a possibility that the PCBC is regarded as an unnecessary control by the driver can be lowered. Besides, a deceleration amount required when it turned out that the PCBC was actually necessary can be ensured.

[Setting of a PCBC Flag]

When having determined that the performing condition for the PCBC is satisfied, the ECU 10 sets a value of the PCBC flag to 1, and performs the PCBC (that is, either one of the PBC or the LPBC). On the other hand, when having determined that the performing condition for the PCBC is not satisfied, the ECU 10 sets the value of the PCBC flag to 0, and does not perform the PCBC. That is, the value of the PCBC flag being 1 means, in the first embodiment apparatus, that the performing condition for the PCBC is satisfied, whereas in the third embodiment apparatus, that the performing condition for the PCBC is satisfied and as a result, the PCBC is performed.

[Setting of a LPBC Flag]

When having determined that the performing condition for the LPBC is satisfied, the ECU 10 sets a value of the LPBC flag to 1, and performs the LPBC. On the other hand, when having determined that the performing condition for the LPBC is not satisfied, the ECU 10 does not perform the LPBC. That is, the value of the LPBC flag being 1 means, in the first embodiment apparatus, that the performing condition for the LPBC is satisfied, whereas in the third embodiment apparatus, that the performing condition for the LPBC is satisfied and as a result, the LPBC is performed.

E. ACC Determination

An ACC determination is processing for determining whether or not to automatically resume the ACC when the PCBC is finished in a case when the PCBC (either one of the PBC or the LPBC) is started during the performance of the ACC. Therefore, the ECU 10 determines whether or not the PCBC flag is 1 every time the predetermined calculation interval elapses during the engine on period, and performs the ACC determination when having determined that the PCBC flag=1 is satisfied.

A specific description will be made below. When the AORC is being performed (that is, when the AOR flag=1), the ECU 10 continues to stop the ACC (more specifically, continues to stop the ACC, this ACC being stopped when the PCBC is started, also after the PCBC is finished) regardless of a degree of the collision risk (that is, regardless of the PCBC being the PBC or the LPBC). Thereby, it becomes possible to surely prompt the driver to intervene in the brake control.

In contrast, when the collision risk is relatively high (that is, when the PBC flag=1 and the LPBC flag=0) in a case where the AORC is not being performed (that is, in a case where the AOR flag=0. In other words, in a case where the trailing by the ACC is being performed), the ECU 10 continues to stop the ACC (more specifically, continues to stop the ACC, this ACC being stopped when the PBC is started, also after the PBC is finished). This is performed regardless of whether the ACC which is being performed at a point in time when the performing condition for the PBC has been determined to be satisfied is the acceleration control or the deceleration control (that is, regardless of whether the AC deceleration control flag is 1 or 0). With this configuration also, it becomes possible to surely prompt the driver to intervene in the brake control.

On the one hand, when the collision risk is relatively low and "the deceleration control by the ACC is being performed at a point in time when the performing condition for the LPBC has been determined to be satisfied (that is, the LPBC flag=1 and the AC deceleration control flag=1)" in a case where the AORC is not being performed (that is, in a case where the AOR flag=0. In other words, in a case where the trailing by the ACC is being performed), the ECU 10 automatically resumes the ACC when the LPBC is finished. Thereby, a possibility of giving a strange and annoying feeling to the driver stemmed from the ACC continuing to be stopped after the LPBC is finished contrary to the driver's expectation can be reduced.

On the other hand, when the collision risk is relatively low but "the acceleration control by the ACC is being performed at a point in time when the performing condition for the LPBC has been determined to be satisfied (that is, the LPBC flag=1 and the AC deceleration control flag=0)" in a case where the AORC is not being performed (that is, in a case where the AOR flag=0. In other words, in a case where the trailing by the ACC is being performed), a deceleration amount based on the ACC cannot be ensured, and thereby it is likely that a deceleration amount based on the LPBC alone is insufficient even in the situation with the low collision risk. Therefore, in such a case as mentioned above, the ECU 10 continues to stop the ACC (more specifically, continues to stop the ACC, this ACC being stopped when the LPBC is started, also after the LPBC is finished). Accordingly, it becomes possible to surely prompt the driver to intervene in the brake control.

Next, the ACC determination processing (refer to the step 512 in FIG. 5) of the third embodiment apparatus will be described.

Figure 11:
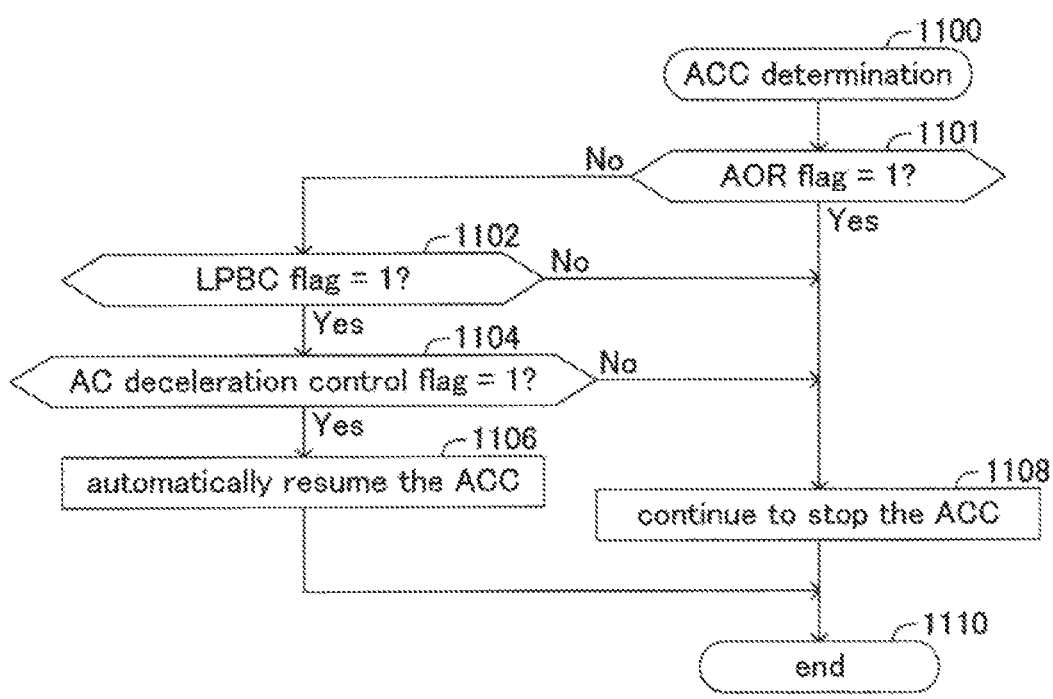
FIG. 11 is a flowchart showing a routine performed by CPU of a third embodiment apparatus.

Step 512: The CPU performs the ACC determination processing. In a routine of the third embodiment apparatus in FIG. 5, the CPU proceeds to the step 512, and subsequently starts processing with a step 1100 in FIG. 11 to proceed to a following step 1101.

At the step 1101, the CPU determines whether or not the value of the AOR flag set at the step 508 in FIG. 5 is 1. When having determined that the AOR flag=1 is not satisfied, the CPU makes a "No" determination at the step 1101 (that is, determines that the AORC is not being performed but the trailing by the ACC is being performed), and proceeds to a following step 1102.

At the step 1102, the CPU determines whether or not the value of the LPBC flag set at the step 504 in FIG. 5 is 1. When having determined that the LPBC flag=1 is satisfied, the CPU makes an "Yes" determination at the step 1102 (that is, determines that the LPBC is started during the performance of the ACC), and proceeds to a following step 1104.

At the step 1104, the CPU determines whether or not the value of the AC deceleration control flag set at the step 508 in FIG. 5 is 1. When having determined that the AC deceleration control flag=1 is satisfied, the CPU makes an "Yes" determination at the step 1104 (that is, determines that the deceleration control by the ACC is being performed at a point in time when the performing condition for the LPBC has been determined to be satisfied), and performs processing of a following step 1106.

Step 1106: The CPU determines to automatically resume the ACC when the LPBC is finished. Thereafter, the CPU proceeds to the step 514 in FIG. 5 via a step 1110 to tentatively terminate the present routine.

In contrast, when having determined that the AOR flag=1 is satisfied at the step 1101, the CPU makes an "Yes" determination at the step 1101 (that is, determines that the AORC is being performed at a point in time when the performing condition for the PCBC has been determined to be satisfied). In addition, when having determined that the LPBC flag=1 is not satisfied (that is, the LPBC flag=0 and the PBC flag=1 are both satisfied) at the step 1102, the CPU makes a "No" determination at the step 1102 (that is, determines that the PBC is started during the performance of the trailing by the ACC). Further, when having determined that the AC deceleration control flag=1 is not satisfied at the step 1104, the CPU makes a "No" determination at the step 1104 (that is, determines that the acceleration control by the ACC is being performed at a point in time when the performing condition for the LPBC has been determined to be satisfied). In such cases as mentioned above, the CPU performs processing of a following step 1108.

Step 1108: The CPU determines to continue to stop the ACC after the PCBC (the PBC or the LPBC) is finished. Thereafter, the CPU proceeds to the step 514 in FIG. 5 via the step 1110 to tentatively terminate the present routine.

Effects of the third embodiment apparatus will be described. In the third embodiment apparatus, the performance of the ACC is stopped when it is determined that the performing condition for the PCBC is satisfied during the performance of the ACC, this performing condition being TTC<TTCth1 in a case of a control object being a preceding vehicle and TTC<TTCth2 in a case of a control object being a pedestrian or a bicycle, and the PCBC is started. Besides, the ACC is automatically resumed after the PCBC is finished, this PCBC being started during the performance of the ACC, when following conditions a and b are satisfied in a case of a control object being a preceding vehicle, or when a following condition c is satisfied in a case of a control object being a pedestrian or a bicycle, in a case where the deceleration control by the ACC is being performed at a point in time when the performing condition for the PCBC has been determined to be satisfied.

In a case of an object subject to the PCBC being a preceding vehicle $LRth1 \leq LR < LRth2$ (Condition a)

$TTCth3 \leq TTC$ (Condition b)

In a case of an object subject to the PCBC being a pedestrian or a bicycle $TTCth4 \leq TTC$ (Condition c)

A case where the conditions a and b are satisfied or the condition c is satisfied in a case when the deceleration control by the ACC is being performed at a point in time when the performing condition for the PCBC has been determined to be satisfied is highly likely to be a case where the driver does not expect that "the performance of the ACC continues to be stopped also after the PCBC (the LPBC) is finished". According to the third embodiment apparatus, the ACC is automatically resumed after the PCBC is finished in such a case. Therefore, an occurrence of a situation where the ACC continues to be stopped after the PCBC is finished contrary to the driver's expectation can be suppressed, and a possibility of giving a strange and annoying feeling to the driver can be reduced.

In addition, in the third embodiment apparatus, the ACC is automatically resumed after the PCBC is finished, this PCBC being started during the performance of the ACC also when the above conditions a and b are satisfied in a case of a control object being a preceding vehicle, or when the above condition c is satisfied in a case of a control object being a pedestrian or a bicycle, in a case where the AORC is being performed at a point in time when the performing condition for the PCBC has been determined to be satisfied.

A case where the conditions a and b are satisfied or the condition c is satisfied in a case when the AORC is being performed at a point in time when the performing condition for the PCBC has been determined to be satisfied is highly likely to be a case where the driver does not expect that "the performance of the ACC continues to be stopped also after the PCBC (the LPBC) is finished". According to the third embodiment apparatus, the ACC is automatically resumed after the PCBC is finished in such a case. Therefore, a possibility of giving a strange and annoying feeling to the driver can be more reduced.

Further, in the third embodiment apparatus, the PCBC consists of two steps, the PBC and the LPBC. According to this configuration, when it is highly likely that the driver does not assume the PCBC to be performed, the light braking force by the LPBC is applied. Therefore, a degree to interfere with the driving operation by the driver can be reduced. In addition, in a case where it turned out that the driver was actually in the avoidance operation necessary situation, a certain amount of deceleration amount can be ensured compared with a configuration where no braking force is applied since the light braking force is applied to the vehicle 100. Thus, a collision avoidance or reduction of a collision damage can be properly realized.

Further, the third embodiment apparatus is configured to change the third time threshold TTCth3 in such a manner that the third time threshold TTCth3 becomes smaller as the lap rate LR becomes low. According to this configuration, even though the TTC to the preceding vehicle becomes shorter (that is, even though the vehicle 100 approaches the preceding vehicle closer), as the lap rate LR becomes lower, the ACC becomes easier to be resumed after the PCBC is finished. Therefore, according to the configuration above, a possibility that the ACC continues to be stopped after the PCBC is finished contrary to the driver's expectation can be further reduced.

Fourth Embodiment

Figure 12:
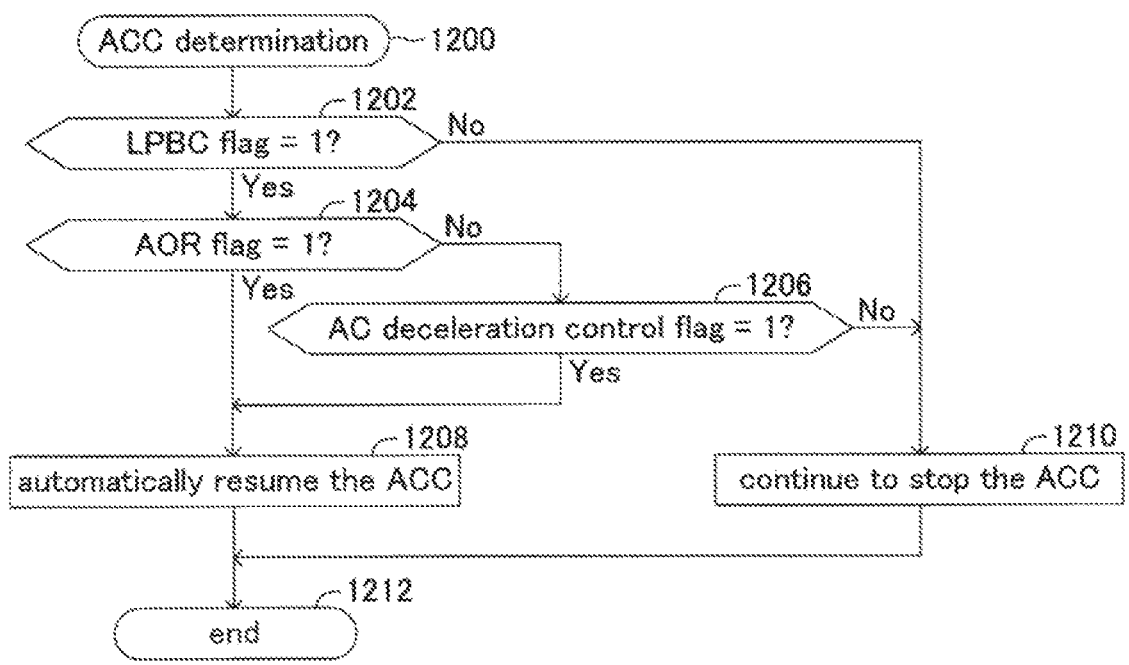
FIG. 12 is a flowchart showing a routine performed by CPU of a fourth embodiment apparatus.

Subsequently, a vehicle control apparatus (a fourth embodiment apparatus) according to a fourth embodiment of the present disclosure will be described below. In the fourth embodiment apparatus, only an ACC determination processing at a step 512 in FIG. 5 differs from that in the third embodiment apparatus. Specifically, in the third embodiment apparatus, when it is determined that the AORC is being performed at a point in time when the performing condition for the PCBC has been determined to be satisfied, the ACC continues to be stopped after the PCBC is finished regardless of the types of the PCBC (refer to an "Yes" at the step 1101 in FIG. 11). In contrast, in the fourth embodiment apparatus, when a type of the PCBC is the LPBC in a case where it is determined that the AORC is being performed at a point in time when the performing condition for the PCBC has been determined to be satisfied, the ACC is automatically resumed after this LPBC is finished (refer to an "Yes" at a step 1204 in FIG. 12 which will be described later). Hereinafter, a description about the ACC determination processing of the fourth embodiment apparatus (refer to the step 512 in FIG. 5) will be made.

Step 512: The CPU performs the ACC determination processing. In a routine of the fourth embodiment apparatus in FIG. 5, the CPU proceeds to the step 512, and subsequently starts processing with a step 1200 in FIG. 12 to proceed to a following step 1202.

At the step 1202, the CPU determines whether or not the value of the LPBC flag set at the step 504 in FIG. 5 is 1. When having determined that the LPBC flag=1 is satisfied, the CPU makes an "Yes" determination at the step 1202 (that is, determines that the LPBC is performed during the performance of the ACC), and proceeds to the following step 1204.

At the step 1204, the CPU determines whether or not the value of the AOR flag set at the step 508 in FIG. 5 is 1. When having determined that the AOR flag=1 is satisfied, the CPU makes an "Yes" determination at the step 1204 (that is, determines that the AORC is being performed at a point in time when the performing condition for the LPBC has been determined to be satisfied), and performs processing of a step 1208 which will be described later.

On the other hand, when having determined that the AOR flag=1 is not satisfied (that is, the AOR flag=0 is satisfied) at the step 1204, the CPU makes a "No" determination at the step 1204 (that is, determines that the trailing by the ACC is being performed in place of the AORC at a point in time when the performing condition for the LPBC has been determined to be satisfied), and proceeds to a following step 1206.

At the step 1206, the CPU determines whether or not the value of the AC deceleration control flag set at the step 508 in FIG. 5 is 1. When having determined that the AC deceleration control flag=1 is satisfied, the CPU makes an "Yes" determination at the step 1206 (that is, determines that the deceleration control by the ACC is being performed at a point in time when the performing condition for the LPBC has been determined to be satisfied), and performs processing of a following step 1208.

Step 1208: The CPU determines to automatically resume the ACC which has been stopped after the LPBC is finished. Thereafter, the CPU proceeds to the step 514 in FIG. 5 via a step 1212 to tentatively terminate the present routine.

In contrast, when having determined that the LPBC flag=1 is not satisfied (that is, the LPBC flag=0 and the PBC flag=1 are both satisfied) at the step 1202, the CPU makes a "No" determination at the step 1202 (that is, determines that the PBC is performed during the performance of the ACC). In addition, when having determined that the AC deceleration control flag=1 is not satisfied at the step 1206, the CPU makes a "No" determination at the step 1206 (that is, determines that the acceleration control by the ACC is being performed at a point in time when the performing condition for the LPBC has been determined to be satisfied).

In such cases as mentioned above, the CPU performs processing of a following step 1210.

Step 1210: The CPU determines to continue to stop the ACC after the PCBC (the PBC or the LPBC) is finished. Thereafter, the CPU proceeds to the step 514 in FIG. 5 via the step 1212 to tentatively terminate the present routine.

With this configuration also, the similar effects to the third embodiment apparatus can be obtained.

In the third embodiment apparatus, when it is determined that the AORC is being performed at a point in time when the performing condition for the PCBC has been determined to be satisfied, the ACC continues to be stopped after the PCBC is finished regardless of the types of the PCBC. The reason why such a configuration is adopted is because the AORC is an acceleration control and therefore a deceleration amount based on the ACC cannot be ensured, resulting in that a deceleration amount may not be able to be sufficiently ensured even in the situation with the low collision risk.

However, from a different perspective, it can be also considered that the AORC is an acceleration control based on a driver's intention and therefore it is highly likely that the driver intervenes in the brake control on his/her own initiative when facing the avoidance operation necessary situation, resulting in that a sufficient deceleration amount can be ensured. Hence, in the fourth embodiment apparatus, when a type of the PCBC is the LPBC in a case where it is determined that the AORC is being performed at a point in time when the performing condition for the PCBC has been determined to be satisfied, the ACC is automatically resumed when the LPBC is finished.

According to the configuration above, when facing the avoidance operation necessary situation with a relatively low collision risk, a deceleration amount based on the brake operation by the driver can be ensured due to the independent intervention in the brake control by the driver, and thus a sufficient deceleration amount can be ensured by combining this deceleration amount with a deceleration amount based on the LPBC. Therefore, it becomes unnecessary to continue to stop the ACC for a purpose of prompting the driver to intervene in the brake control. Thus, according to the configuration of the fourth embodiment apparatus, a deceleration amount can be sufficiently ensured in the avoidance operation necessary situation with the relatively low collision risk, and a possibility of giving a strange and annoying feeling to the driver stemmed from the ACC continuing to be stopped after the LPBC is finished contrary to the driver's expectation can be further reduced.

The vehicle control apparatuses according to the embodiments have been described. However, the present disclosure is not limited to them and may adopt various modifications within a scope of the present disclosure.

For example, the PCBC may be a control for applying a braking force with one stage or braking forces with more than or equal to three stages, in place of a control with two stages. Besides, the PCBC may be a control for informing the driver of the brake operation being necessary by issuing a warning in addition to a control for applying the braking force.

Further, the above embodiments adopt a configuration where only the PBC is performed in a case of the high lap. However, a configuration is not limited thereto. For example, a configuration where the LPBC is performed in addition to the PBC in a case of the high lap may be adopted. In this case, the LPBC is performed when the TTC is more than or equal to the first time threshold TTCth1 and less than a predetermined time threshold (>TTCth1) in a case of the high lap.

In addition, the second time threshold TTCth2 may be equal to the first time threshold TTCth1. Alternatively, the first time threshold TTCth1 may not be constant, but change depending on the lap rate LR. In contrast, the third time threshold TTCth3 may not change depending on the lap rate LR, but be constant. In this case, the third time threshold TTCth3 may be equal to the fourth time threshold TTCth4.

Further, the first time threshold TTCth1 may not be limited to the brake avoidance limit time $T_B$, but other time thresholds may be set as the first time threshold TTCth1. Similarly, the third time threshold TTCth3 may not be limited to the steering avoidance limit time $T_S$, but other time thresholds may be set as the third time threshold TTCth3.

The invention claimed is:

1. A vehicle control apparatus applied to an own vehicle comprising:
    an electric control unit configured to:
    perform, as an adaptive cruise control, a preceding vehicle trailing control which makes said own vehicle trail a preceding vehicle which is a vehicle traveling ahead of said own vehicle by performing an acceleration control for accelerating said own vehicle and a deceleration control for decelerating said own vehicle so that an acceleration of said own vehicle coincides with a target acceleration, said target acceleration being calculated based on a distance to said preceding vehicle and a relative speed with respect to said preceding vehicle; and
    perform a pre-crash brake control which automatically applies a predetermined braking force to said own vehicle when a collision risk satisfies a predetermined condition,
    wherein the electric control unit is further configured to determine, during a performance of said adaptive cruise control, which one of said adaptive cruise control or said pre-crash brake control to perform based on the collision risk and a control status of said adaptive cruise control.

2. The vehicle control apparatus according to claim 1, wherein,
    said electric control unit is configured to:
    perform said pre-crash brake control in preference to said adaptive cruise control despite the control status of said adaptive cruise control when a first condition is determined to be satisfied, the first condition being satisfied when the collision risk is relatively high.

3. The vehicle control apparatus according to claim 1, wherein,
    said electric control unit is configured to:
    determine whether or not to perform said pre-crash brake control in preference to said adaptive cruise control based on the control status of said adaptive cruise control when a second condition is determined to be satisfied, the second condition being satisfied when the collision risk is relatively low.

4. The vehicle control apparatus according to claim 3, wherein,
    said electric control unit is configured to perform said adaptive cruise control in preference to said pre-crash brake control when the control status of said adaptive cruise control is said deceleration control in a case in which the second condition is determined to be satisfied.

5. The vehicle control apparatus according to claim 3, wherein,
said electric control unit is configured to:
perform said pre-crash brake control in preference to said adaptive cruise control when the control status of said adaptive cruise control is said acceleration control in a case in which the second condition is determined to be satisfied.

6. A vehicle control apparatus applied to an own vehicle comprising an electronic control unit configured top:
perform, as an adaptive cruise control, a preceding vehicle trailing control which makes said own vehicle trail a preceding vehicle which is a vehicle traveling ahead of said own vehicle by performing an acceleration control for accelerating said own vehicle and a deceleration control for decelerating said own vehicle so that an acceleration of said own vehicle coincides with a target acceleration, said target acceleration being calculated based on a distance to said preceding vehicle and a relative speed with respect to said preceding vehicle; and
perform a pre-crash brake control which automatically applies a predetermined braking force to said own vehicle when a collision risk satisfies a predetermined condition;
wherein the electronic control unit is further configured to determine, when said adaptive cruise control is stopped and said pre-crash brake control is started during a performance of said adaptive cruise control, whether or not to automatically resume said adaptive cruise control after the performance of said pre-crash brake control based on the collision risk and a control status of said adaptive cruise control.

7. The vehicle control apparatus according to claim 6, wherein said electronic control unit is configured not to automatically resume said adaptive cruise control after the performance of said pre-crash brake control despite the control status of said adaptive cruise control when a first condition is determined to be satisfied, the first condition being satisfied when the collision risk is relatively high.

8. The vehicle control apparatus according to claim 6, wherein, said electronic control unit is configured to:
determine whether or not to automatically resume said adaptive cruise control after the performance of said pre-crash brake control based on the control status of said adaptive cruise control which has been performed before said pre-crash brake control is started when a second condition is determined to be satisfied, the second condition being satisfied when the collision risk is relatively low.

9. The vehicle control apparatus according to claim 8, wherein, said electronic control unit is configured to automatically resume said adaptive cruise control after the performance of said pre-crash brake control when the control status of said adaptive cruise control is said deceleration control in a case in which the second condition is determined to be satisfied.

10. The vehicle control apparatus according to claim 8, wherein, said electronic control unit is configured not to automatically resume said adaptive cruise control after the performance of said pre-crash brake control when the control status of said adaptive cruise control is said acceleration control in a case in which the second condition is determined to be satisfied.

* * * * *